Feb. 1, 1966     E. G. FEHER     3,232,633
VEHICLES WITH MEANS TO SELECTIVELY INCREASE THE
EFFECTIVE WEIGHT THEREOF
Filed Oct. 2, 1961     13 Sheets-Sheet 3
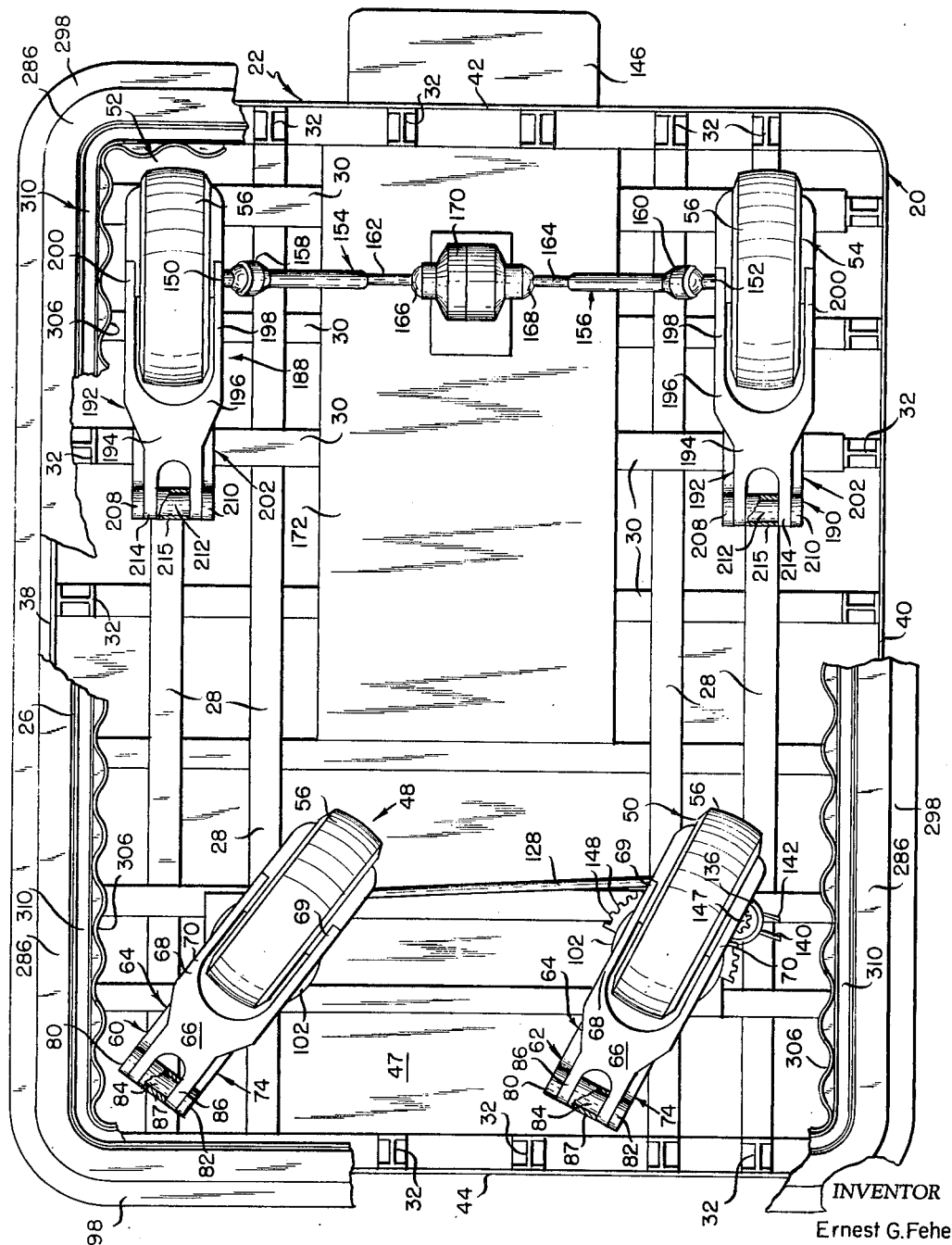
INVENTOR
Ernest G. Feher
BY    *Strauch, Nolan + Neale*
ATTORNEYS

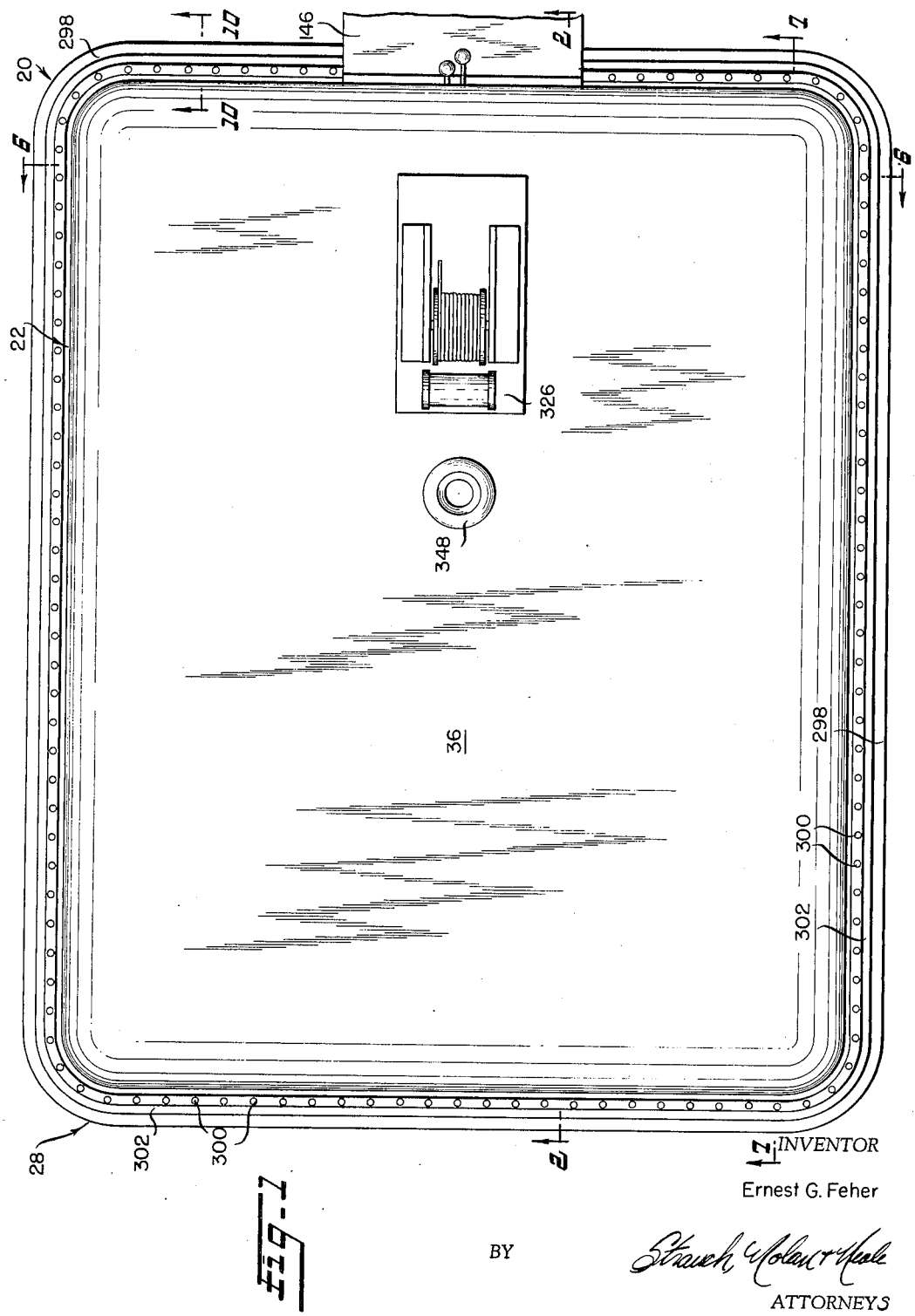

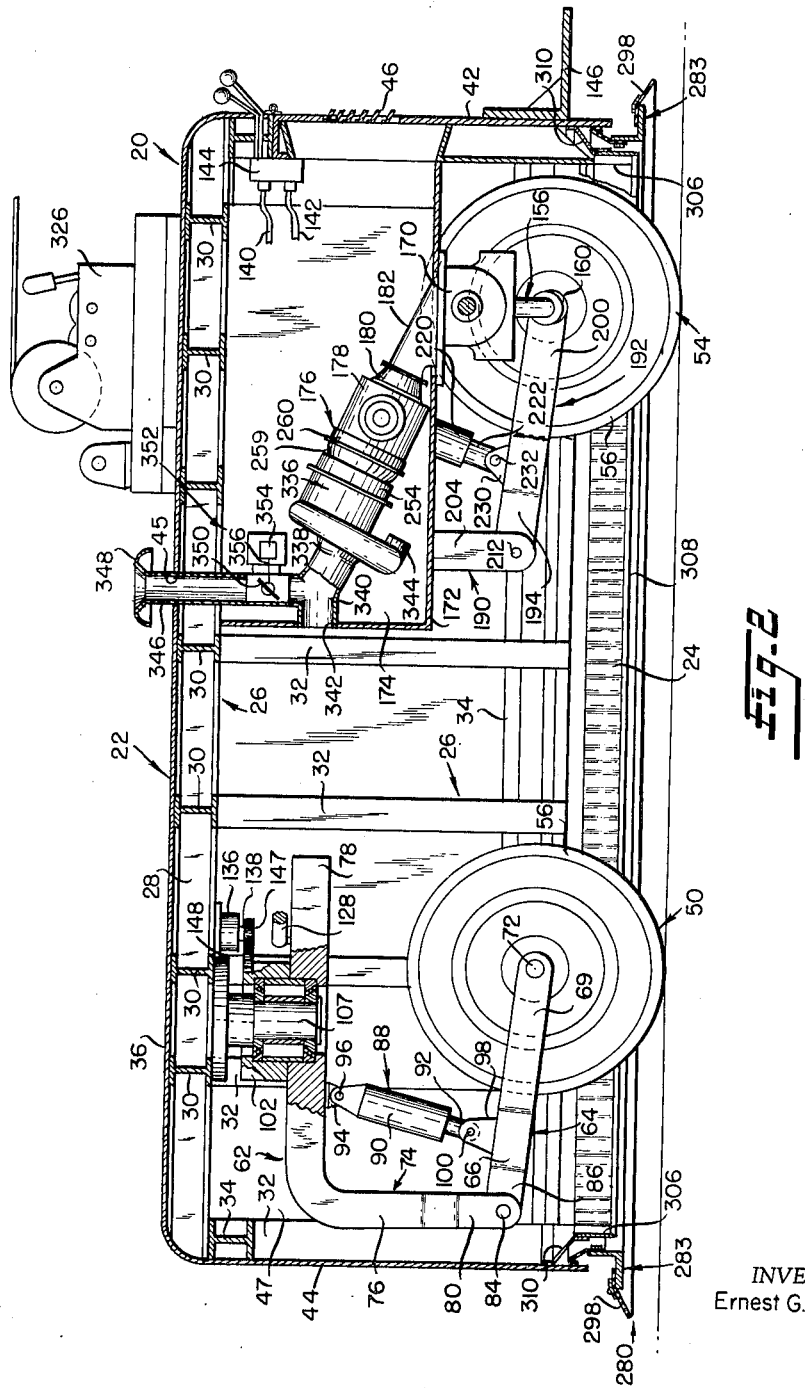

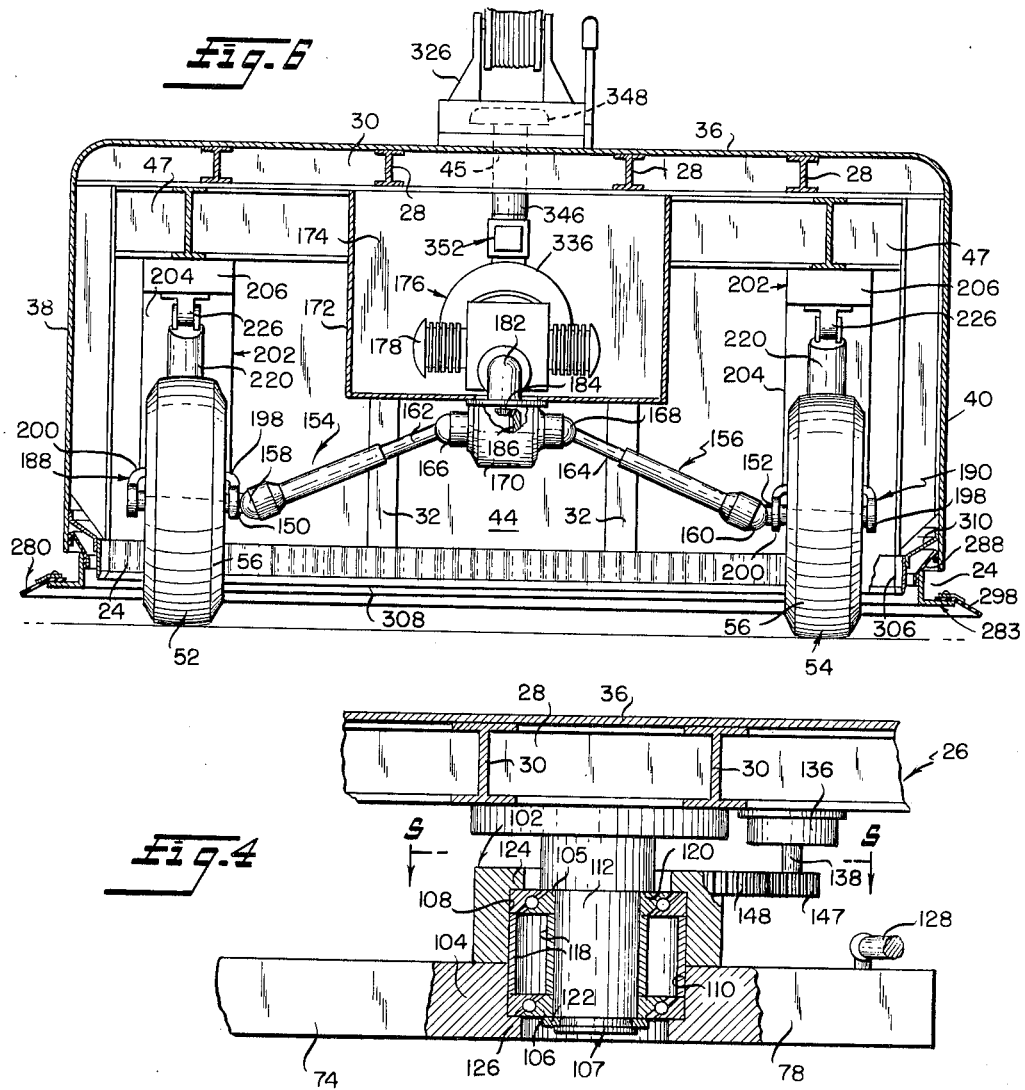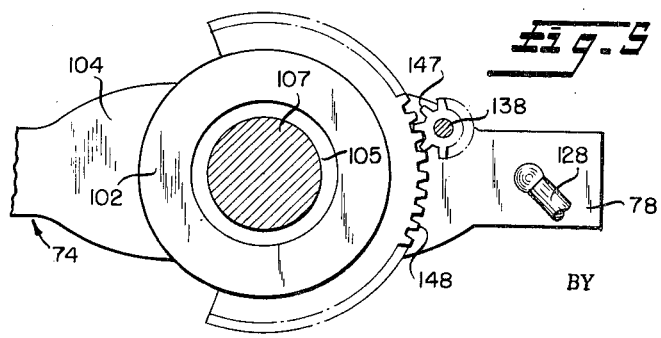

Feb. 1, 1966   E. G. FEHER   3,232,633
VEHICLES WITH MEANS TO SELECTIVELY INCREASE THE
EFFECTIVE WEIGHT THEREOF
Filed Oct. 2, 1961   13 Sheets-Sheet 5

INVENTOR
Ernest G. Feher

BY
ATTORNEYS

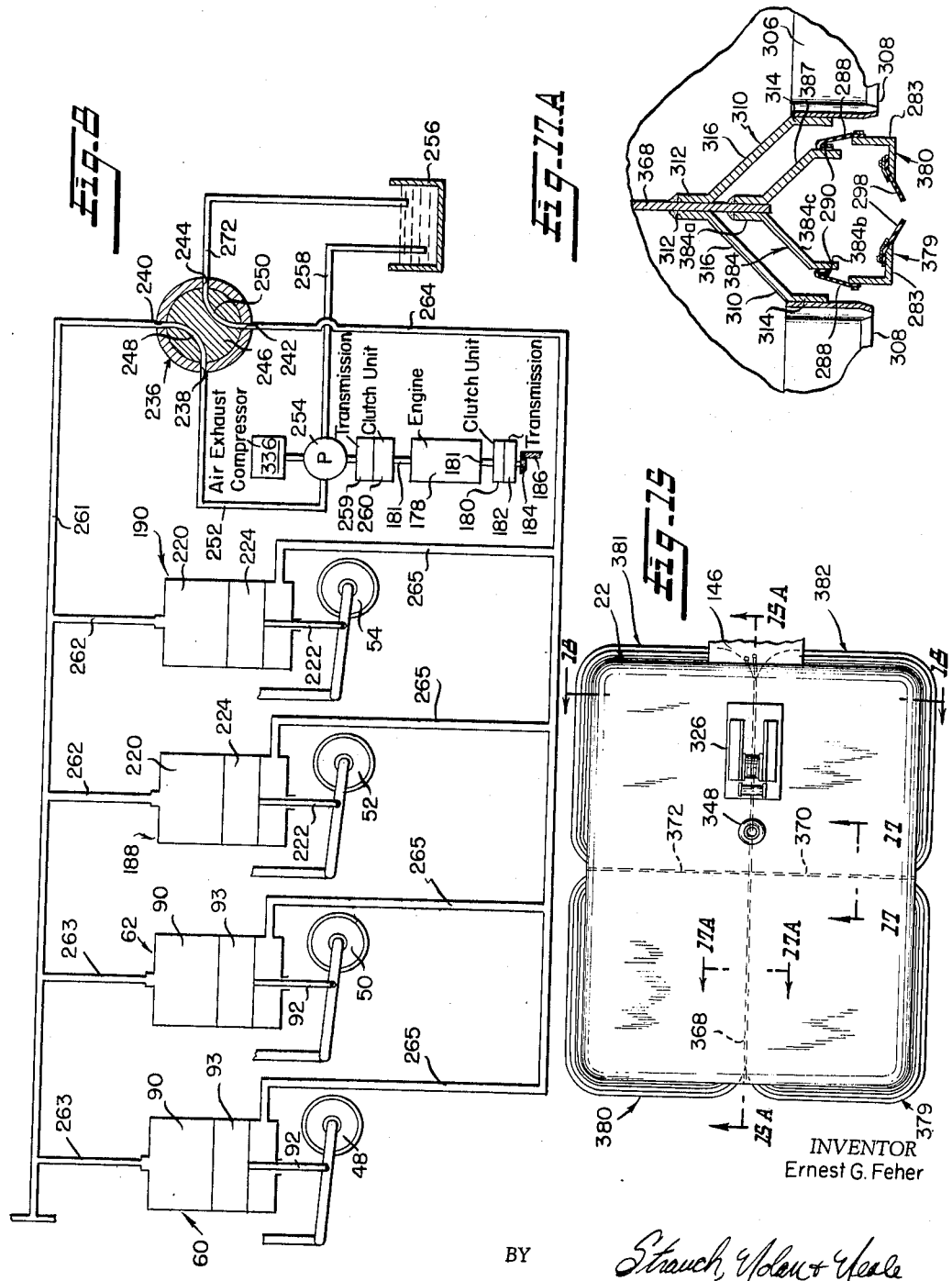

Feb. 1, 1966　　　　　　E. G. FEHER　　　　　3,232,633
VEHICLES WITH MEANS TO SELECTIVELY INCREASE THE
EFFECTIVE WEIGHT THEREOF
Filed Oct. 2, 1961　　　　　　　　　　　　　　13 Sheets-Sheet 7
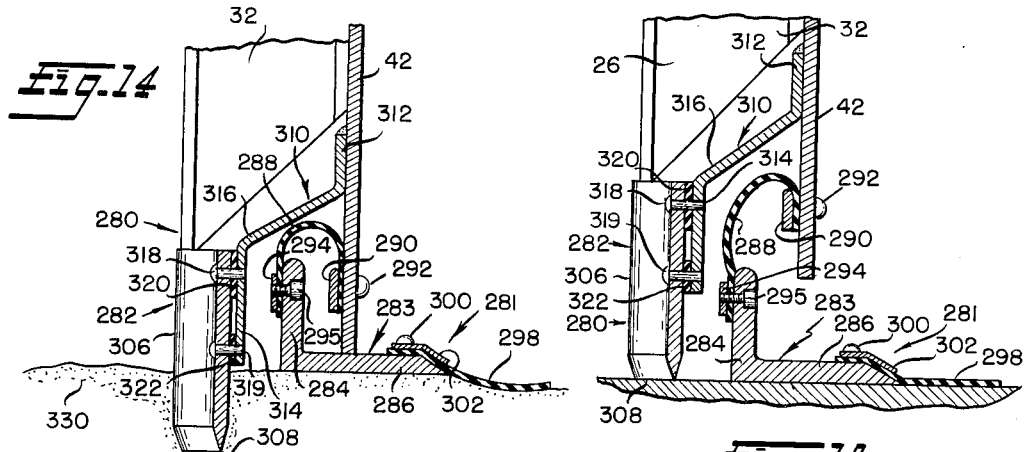
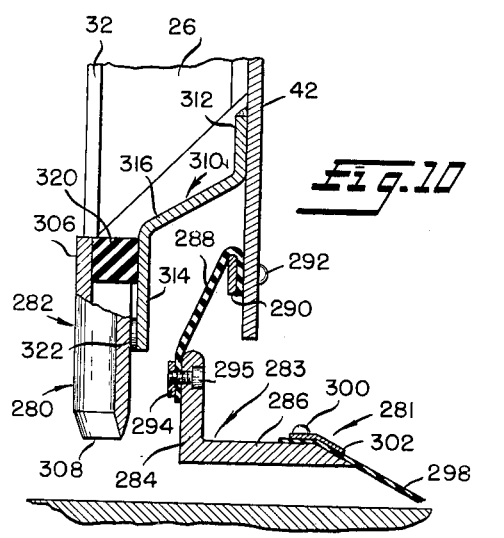
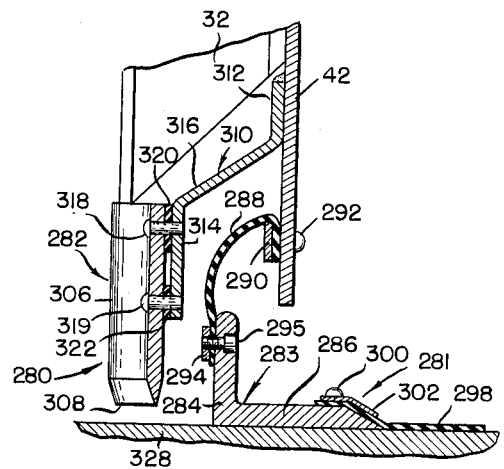
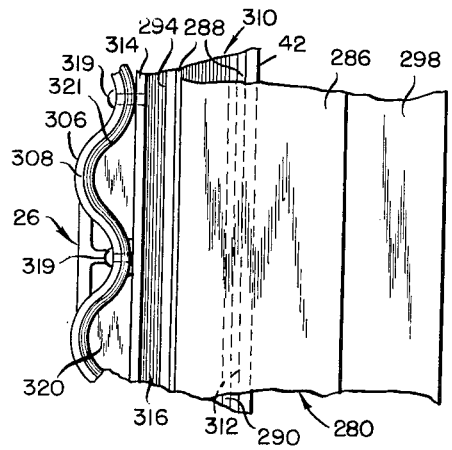
INVENTOR
Ernest G. Feher
BY
Strauch, Nolan & Neale
ATTORNEYS

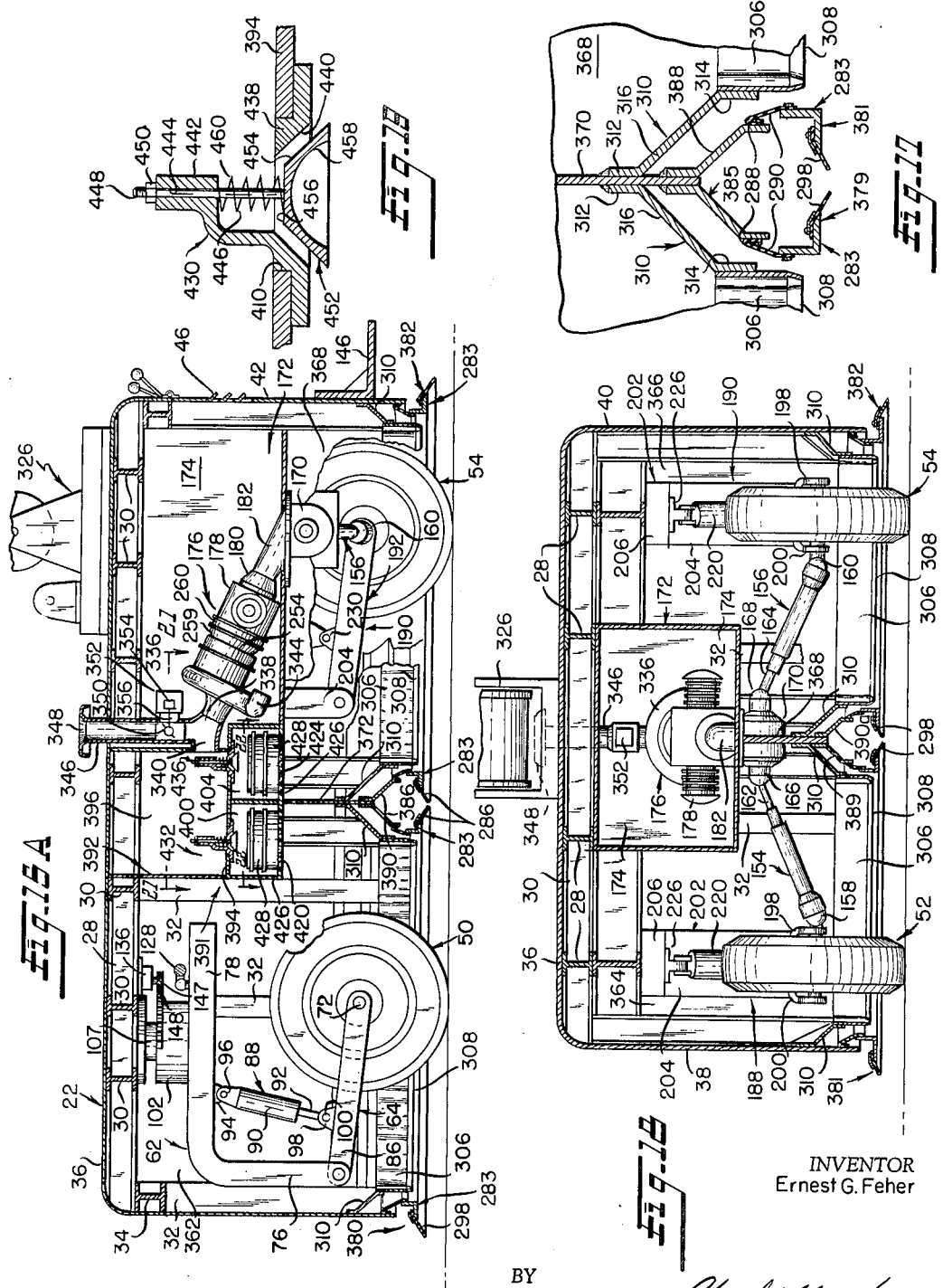

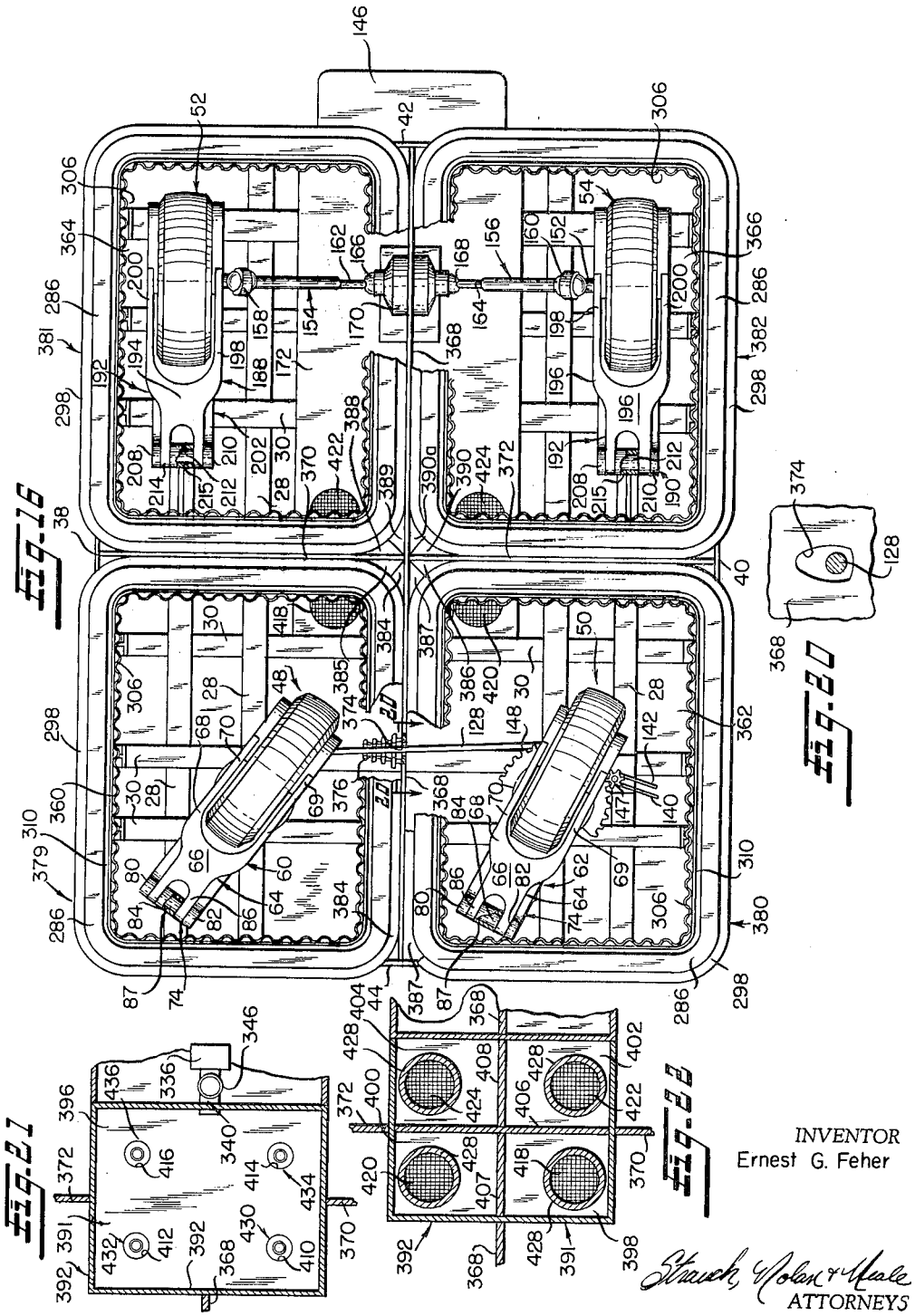

Feb. 1, 1966     E. G. FEHER     3,232,633
VEHICLES WITH MEANS TO SELECTIVELY INCREASE THE EFFECTIVE WEIGHT THEREOF
Filed Oct. 2, 1961     13 Sheets-Sheet 10
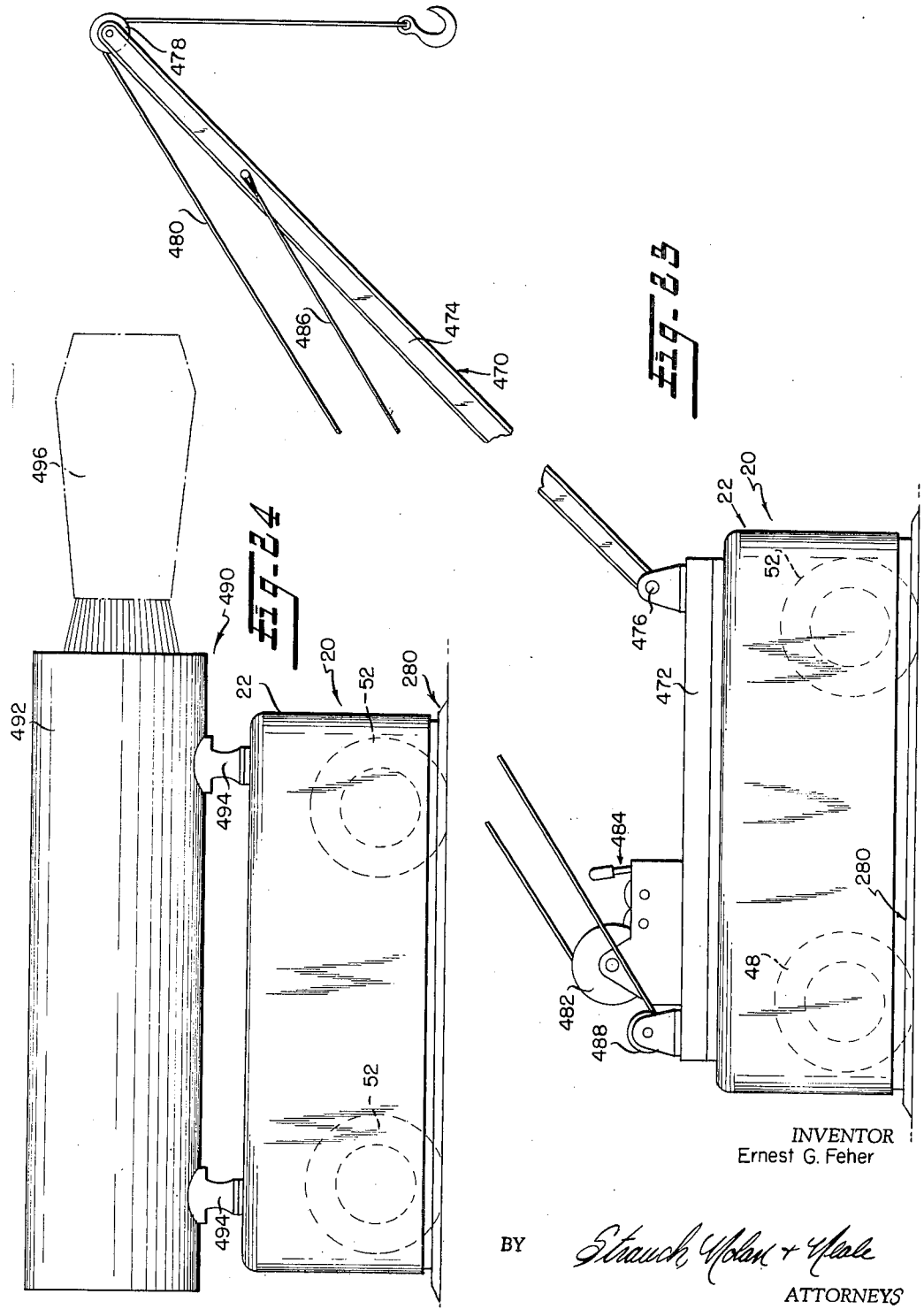
INVENTOR
Ernest G. Feher

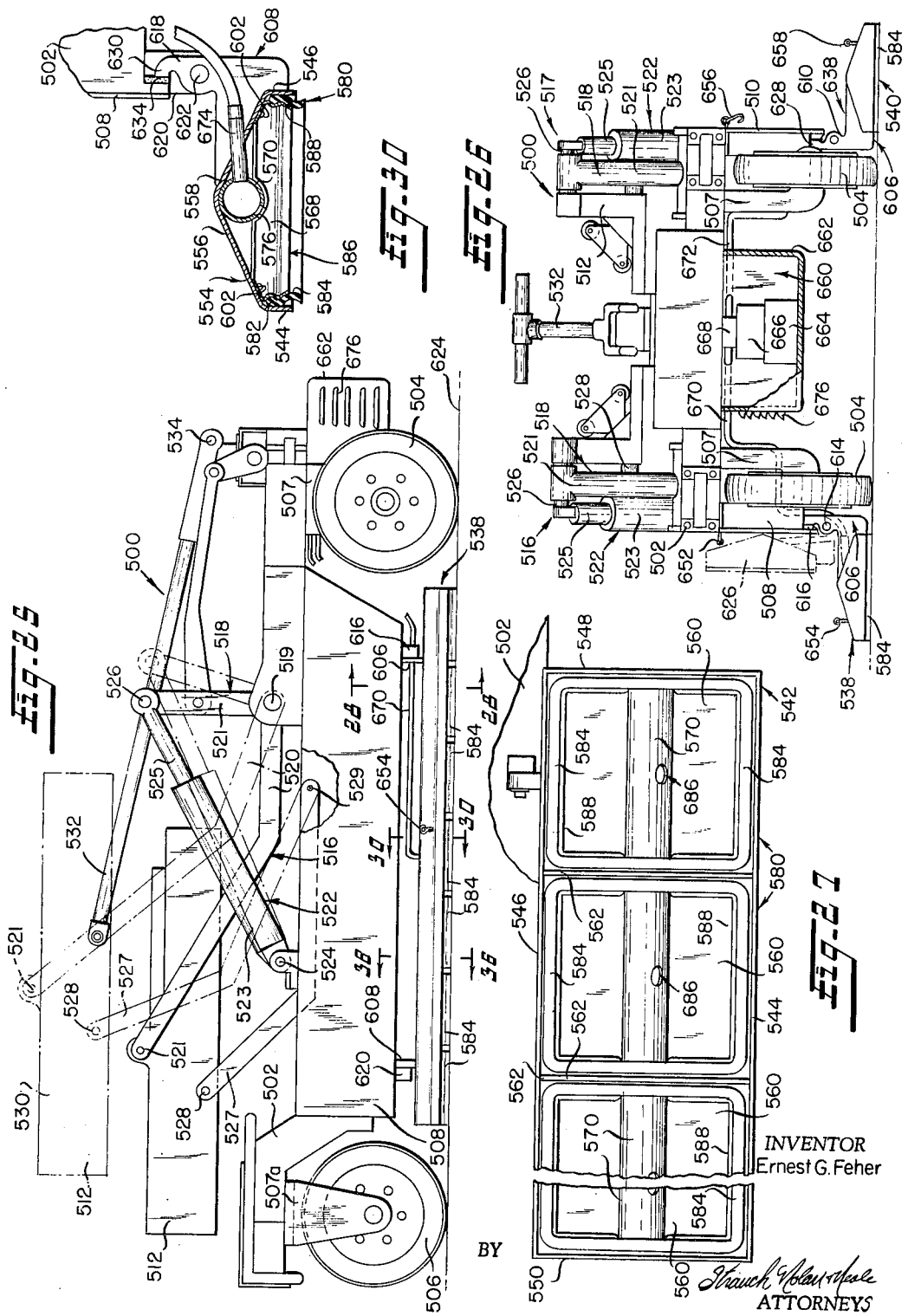

Feb. 1, 1966 E. G. FEHER 3,232,633
VEHICLES WITH MEANS TO SELECTIVELY INCREASE THE
EFFECTIVE WEIGHT THEREOF
Filed Oct. 2, 1961 13 Sheets-Sheet 12
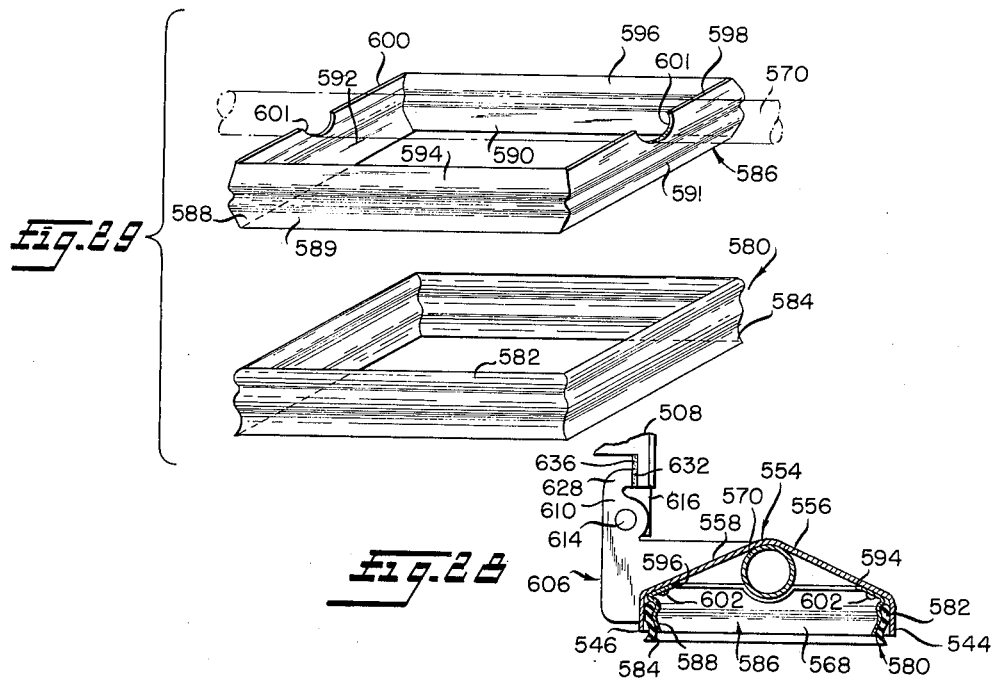
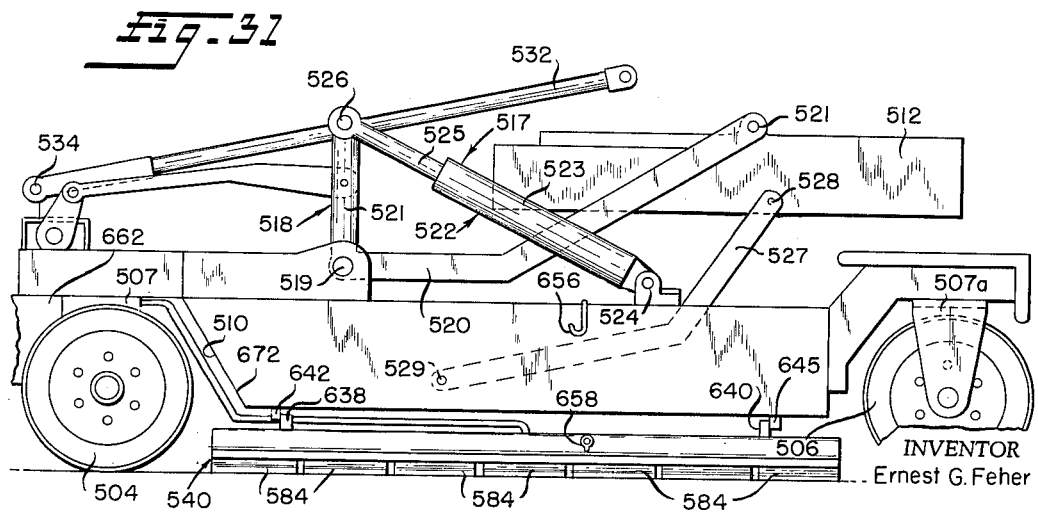
INVENTOR
Ernest G. Feher
BY *Strauch, Nolan & Neale*
ATTORNEYS

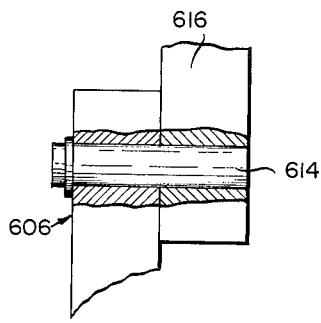
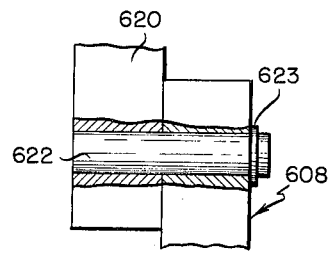
Fig. 32    Fig. 33
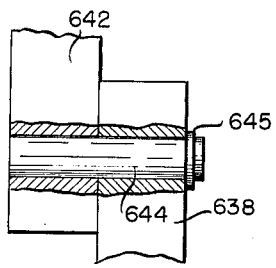
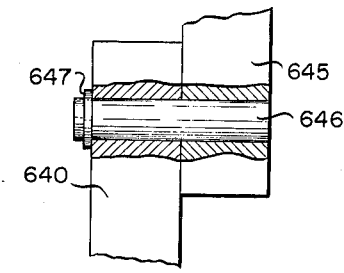
Fig. 34    Fig. 35
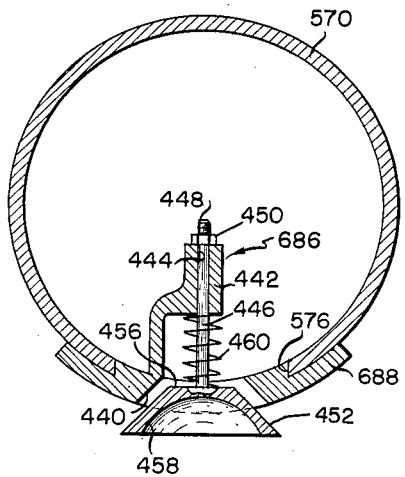
Fig. 36
INVENTOR
Ernest G. Feher
BY
ATTORNEYS

United States Patent Office 3,232,633
Patented Feb. 1, 1966

3,232,633
VEHICLES WITH MEANS TO SELECTIVELY INCREASE THE EFFECTIVE WEIGHT THEREOF
Ernest G. Feher, San Diego, Calif., assignor to Solar Aircraft Company, San Diego, Calif., a corporation of California
Filed Oct. 2, 1961, Ser. No. 142,207
3 Claims. (Cl. 280—43.23)

The present invention relates to vehicles and more particularly to a wheeled vehicle having an effective weight or adherent force which may be selectively increased by application of atmospheric pressure without increasing the actual mass of the vehicle.

Prior to the present invention, it has been recognized that the traction or, more particularly, the grip of the wheels of a motor vehicle may be increased by application of various auxiliary devices. One such device is disclosed in United States Patent No. 1,698,482 issued January 8, 1929 to V. Nicin for Motor Vehicles in which an air evacuation box formed with an open bottom is suspended from the vehicle chassis between the wheels of the vehicle and purportedly arranged to effectively sealingly cooperate with the road surface to form with the road surface a confined space. By evacuating this confined space, a pressure differential is established to press the wheels of the vehicle against the ground with an increased force to thereby provide a corresponding increase in the traction of the vehicle.

The primary purpose of Nicin's structure is to resist, to some degree, skidding of the motor vehicle on wet or icy pavements while the vehicle is in motion. Such evacuation units are not adequately effective to assure a stable positioning of the vehicle when lifting forces are applied in opposition to the traction forces established by the effective weight of the vehicle, or when the vehicle support surface is a pitching surface such as a ship's deck. Furthermore, such evacuation units are not satisfactorily adequate to increase the effective weight of the vehicle sufficiently for enabling the vehicle to function as an anchoring platform for moving relatively heavier objects as by a winch mounted on the vehicle.

In addition, the prior art pressure-weighted air-box structures do not provide for an adequate resistive force to enable the vehicle to perform various useful functions under uncommon and adverse conditions. For example, such constructions would not be effective aboard aircraft carriers or like marine vessels having substantially flat decks which pitch and become extremely slick in heavy seas. The nature and extent of the pitching of vessels and the extreme slickness of the deck requires an exceptionally effective force to prevent the vehicle from slipping and skidding over the deck or to retain it stably in place while performing various functions such as hauling aircraft by means of a winch mounted on the vehicle.

The inadequacy of the resistive force produced by such prior evacuation systems is due to the actual magnitude of force which can be developed and also due to the dynamic disposition of the resistive force relative to the wheels of the vehicle, to the center of gravity of the vehicle, and to other opposing forces tending to tip and shift the vehicle in one direction or the other, particularly as a result of pitching movements encountered on decks of marine vessels. The upsetting forces resulting from pitching of a ship deck are appreciably intensified when the vehicle is outfitted with a lifting crane such that in lifting and transferring loads, large overhanging forces act to tilt the vehicle in addition to the forces resulting from frequently pitching and slick decks.

Since the entire resistive force produced by the prior art evacuation systems is centralized between the wheels of the vehicle and is in approximate alignment with the center of gravity of the vehicle, the resistive force in opposing those forces which tend to upset the vehicle about the right-hand or left-hand wheels acts along a comparatively small movement arm which is about one-half the width of the vehicle.

The present invention in overcoming the foregoing problems generally contemplates a lightweight atmospheric pressure weighted vehicle in which the weight of the vehicle is effectively increased without increasing the actual mass of the vehicle and is particularly useful aboard aircraft carriers and like marine vessels. The atmospheric-pressure-produced forces acting on the vehicle of the present invention are dynamically arranged relative to the vehicle to effectively resist forces tending to tilt or shift the vehicle in one direction or the other. In addition, the present invention efficiently utilizes atmospheric air pressure to appreciably increase the effective weight of the vehicle to enable it to move loads of substantially greater weight than the normal weight of the vehicle itself.

In general, the present invention is particularly suited to resist movement of the vehicle from a stable position so that it may be used as an anchoring platform in various applications such as hauling loads by means of a winch mounted on the vehicle, lifting loads with a crane carried by the vehicle, resisting the thrust of jet airplane engines by means of a silencer mounted on the vehicle, or lifting bombs into aircraft bombays by means of special bomb racks mounted on the vehicle.

By evacuating one or more novelly arranged ground engaging air evacuation compartments of the present invention, a uniform force pattern resulting from the application of atmospheric pressure is particularly produced outwardly and laterally beyond the sides of both the left-hand wheels and the right-hand wheels of the vehicle. Due to this dynamic relationship of the resistive evacuation force relative to the vehicle, tilting movement of the vehicle is effectively opposed in addition to appreciably increasing the static adhesive friction of the vehicle.

It is, accordingly, the primary object of the present invention to provide a novel lightweight vehicle having an effective weight which may be selectively increased by application of atmospheric pressure without increasing the actual mass of the vehicle.

A further object of the present invention is to provide a novel lightweight vehicle having an evacuation system for establishing an atmospheric-pressure-exerted-force in relation to the vehicle to enable the vehicle to perform useful functions without tilting or relative shifting especially with respect to deck surfaces aboard aircraft carriers and like marine vessels.

A further object of the present invention resides in the provision of a novel lightweight wheeled vehicle in which downwardly acting traction forces may be selectively produced at least laterally outwardly of the wheels to resist tilting and shifting of the vehicle without increasing the actual mass of the vehicle.

Another more specific object of the present invention resides in the provision of a novel lightweight wheeled vehicle having a case-like structure which is arranged to coact with the vehicle support surface to form at least one chamber extending laterally outwardly from the wheels in combination with an air evacuation unit for enabling sub-atmospheric evacuation of air from the chamber to produce an atmospheric-pressure-weighted force acting laterally outwardly of the wheels to resist forces tending to tilt the vehicle to one side or the other.

Still another object of the present invention resides in the provision of a novel lightweight wheeled vehicle having a special encased body coacting with the vehicle support surface to form an evacuation chamber which may be evacuated to produce an atmospheric-pressure-weighted force on the body for increasing the adhesive friction of the vehicle.

Another and more specific object of the present invention resides in the provision of a novel lightweight wheeled vehicle having an encased body formed with an open bottom through which the vehicle wheels partially project to support the body clear of the support surface, with the body being arranged to coact with the support surface to form an evacuation chamber which may be evacuated to apply an atmospheric-pressure-weighted force to the vehicle body.

Still another object of the present invention resides in the provision of a novel lightweight vehicle having dirigible and non-dirigible wheels and a system whereby all the wheels are selectively retractable and extendible simultaneously to lower and raise the vehicle body relative to the vehicle support surface engaged by the wheels of the vehicle.

A further object of the present invention resides in the provision of a novel endless sealing unit which is engageable with a support surface for confining an evacuation chamber in a wheeled vehicle and for enabling sub-atmospheric evacuation of the chamber to produce an atmospheric-pressure-weighted force on the vehicle.

Still another object of the present invention resides in the provision of a novel sealing unit as in the preceding object in which two endless ground-engageable seals are provided for with one of the endless seals being in surrounding relationship to the other endless seal.

A further object of the present invention resides in the provision of a novel sealing unit as in the preceding object in which one of the endless seals is flexible for particular use on a hard vehicle support surface and the other endless seal is rigid for penetrating into soft terrain.

Still a further object of the present invention resides in the provision of a novel sealing unit which is engageable with a support surface for confining an evacuation chamber in a vehicle to enable sub-atmospheric evacuation of the chamber and which is rigid to support the weight of the vehicle either alone or jointly with the wheels of the vehicle.

Another more specific object of the present invention resides in the provision of a novel lightweight wheeled vehicle having a body which has an open bottom and which may be selectively raised and lowered relative to the vehicle support surface to coact with the surface for forming an air evacuation chamber, the vehicle body carrying a sealing unit engageable with the support surface for forming an endless seal around the periphery of the open bottom to thereby confine the chamber for enabling sub-atmospheric evacuation of the chamber.

Still a further object of the present invention resides in the provision of a novel lightweight self-propelled wheeled vehicle having a body with an air compartment section engageable with the vehicle support surface to form an evacuation chamber, and an evacuation unit for withdrawing air from the chamber and delivering it to cool an engine which supplies power to propel the vehicle or auxiliary power equipment.

Another object of the present invention resides in the provision of a novel lightweight vehicle as in the preceding object in which a by-pass arrangement is provided to automatically supply fresh air from the atmosphere for cooling the engine after the air supply in the evacuation chamber has been depleted.

Still another object of the present invention resides in the provision of a novel lightweight wheeled vehicle having a body formed with a plurality of air compartment sections engageable with the vehicle support surface to form air evacuation chambers with each of the compartment sections having their individual ground-engageable sealing units to confine the chambers and to enable a sub-atmospheric evacuation of the chambers, the arrangement of the compartment sections and the sealing units being such that where one or more sealing units fails to establish a seal and permits leakage of air, evacuation of the remaining chambers may still be accomplished.

A further object of the present invention resides in the provision of a novel lightweight wheeled vehicle as in the preceding object in which evacuation of the chambers is accomplished by a common evacuation unit in cooperation with a special valving assembly which is operable to automatically isolate any chamber in which there is air leakage, thus permitting the evacuation of the remaining chambers in which there is no leakage.

Still a further object of the present invention is to provide a wheeled vehicle having a body, a pair of pressure pads attached to the sides of the body and engageable with the vehicle support surface to form air evacuation chambers laterally outwardly from the sides of the vehicle wheels in outrigger fashion, and an evacuation unit for enabling a sub-atmospheric evacuation of the chambers to establish atmospheric-pressure-weighted forces acting at least in part laterally outwardly of the vehicle wheels to increase the adhesive friction of the vehicle and to resist forces tending to tilt the vehicle to one side or the other.

Further objects of the present invention will appear as the description proceeds in connection with the appended claims and the annexed drawings wherein:

FIGURE 2 is a section taken substantially along lines 2—2 of FIGURE 1;

FIGURE 3 is a bottom plan view of the vehicle illustrated in FIGURE 1 and with the endless sealing unit for the vehicle evacuation compartment partially broken away to show interior details of the vehicle;

FIGURE 4 is an enlarged partially sectioned fragmentary elevational view of the steering knuckle and king pin structure shown in FIGURE 2 for rotatably mounting the dirigible wheels of the vehicle together with the steering apparatus for selectively turning the dirigible wheels in one direction or the other;

FIGURE 5 is a section taken susbtantially along lines 5—5 of FIGURE 4;

FIGURE 6 is a section taken substantially along lines 6—6 of FIGURE 1;

FIGURE 7 is a section taken substantially along lines 7—7 of FIGURE 1 and showing the wheels of the vehicle in extended positions to support the body of the vehicle clear of the vehicle support surface;

FIGURE 8 is a schematic diagram of the hydraulic system for selectively retracting and extending the wheels of the vehicle of FIGURE 1;

FIGURE 10 is an enlarged fragmentary section taken substantially along lines 10—10 of FIGURE 1 and showing details of the endless sealing unit for the vehicle in FIGURE 1;

FIGURE 11 is an enlarged fragmentary bottom plan view of the sealing unit shown in FIGURE 10;

FIGURE 12 is an enlarged fragmentary section similar to FIGURE 10 but showing the vehicle body lowered to a first position where the flexible sealing rim and rigid loading rim engage the vehicle support surface with the rigid endless seal spaced above the vehicle surface;

FIGURE 13 is an enlarged fragmentary section similar to FIGURE 10 but with the vehicle body lowered to a second position where the endless flexible sealing rim, the loading rim, and the rigid endless seal are all in intimate contact with the vehicle support surface;

FIGURE 14 is an enlarged fragmentary section view similar to FIGURE 10 and showing the engagement of the sealing unit on soft terrain where the rigid endless seal penetrates into the terrain and the flexible endless rim is in intimate contact on the terrain surface;

FIGURE 15 is a top plan view of a vehicle according to a further embodiment of the present invention in which the interior of the vehicle illustrated in FIGURES 1–14 is divided into a plurality of evacuation compartments;

FIGURE 15a is a section along lines 15a—15a of FIGURE 15;

FIGURE 16 is a bottom plan view of the vehicle shown in FIGURE 15;

FIGURE 17 is an enlarged fragmentary section taken substantially along lines 17—17 of FIGURE 15 and showing details relating to the mounting of the compartment sealing units;

FIGURE 17a is an enlarged fragmentary section similar to FIGURE 17 and taken substantially along lines 17a—17a of FIGURE 15;

FIGURE 18 is a section taken substantially along lines 18—18 of FIGURE 15;

FIGURE 19 is an enlarged fragmentary sectional view of a typical valve assembly for the evacuation compartment valve assembly illustrated in FIGURE 15a;

FIGURE 20 is a section taken substantially along lines 20—20 of FIGURE 16;

FIGURE 21 is a section taken substantially along lines 21—21 of FIGURE 15a;

FIGURE 22 is a section taken substantially along lines 22—22 of FIGURE 15a;

FIGURE 23 is a side elevational view of the vehicle illustrated in FIGURE 1 with wheels of the vehicle retracted to positions within the evacuation compartment formed by the body of the vehicle and with the winch of FIGURE 1 replaced by a lifting crane;

FIGURE 24 is a side elevational view of the vehicle illustrated in FIGURE 1 with the wheels of the vehicle retracted to positions within the evacuation compartment formed by the body of the vehicle and with the winch of FIGURE 1 replaced by a jet engine silencer;

FIGURE 25 is a left-hand side elevational view of a wheeled vehicle according to still another embodiment of the present invention;

FIGURE 26 is a front elevational view of the vehicle illustrated in FIGURE 25;

FIGURE 27 is an enlarged fragmentary bottom plan view of the vehicle illustrated in FIGURE 25 and showing details of the pressure pads attached to the vehicle frame;

FIGURE 28 is a section taken substantially along lines 28—28 of FIGURE 25;

FIGURE 29 is an enlarged perspective exploded view of the sealing strip and spring clip insert for the evacuation compartments illustrated in FIGURES 27 and 28;

FIGURE 30 is a section taken substantially along lines 30—30 of FIGURE 25;

FIGURE 31 is a right-hand side elevational view of the vehicle illustrated in FIGURE 25;

FIGURE 32 is an enlarged fragmentary partially sectioned side elevational view of the forward pivot mounting structure for the left-hand pressure pad illustrated in FIGURE 25;

FIGURE 33 is an enlarged fragmentary partially sectioned side elevational view of the rearward pivot mounting structure for the left-hand pressure pad illustrated in FIGURE 25;

FIGURE 34 is an enlarged fragmentary partially sectioned side elevational view of the forward pivot mounting structure for the right-hand pressure pad illustrated in FIGURE 31;

FIGURE 35 is an enlarged fragmentary partially sectioned side elevational view of the rearward pivot mounting structure for the right-hand pressure pad illustrated in FIGURE 31; and FIGURE 36 is an enlarged fragmentary section taken substantially along lines 36—36 of FIGURE 25 and showing details of a differential valve for controlling evacuation of air from the compartments of the pressure pad.

Figure 1:
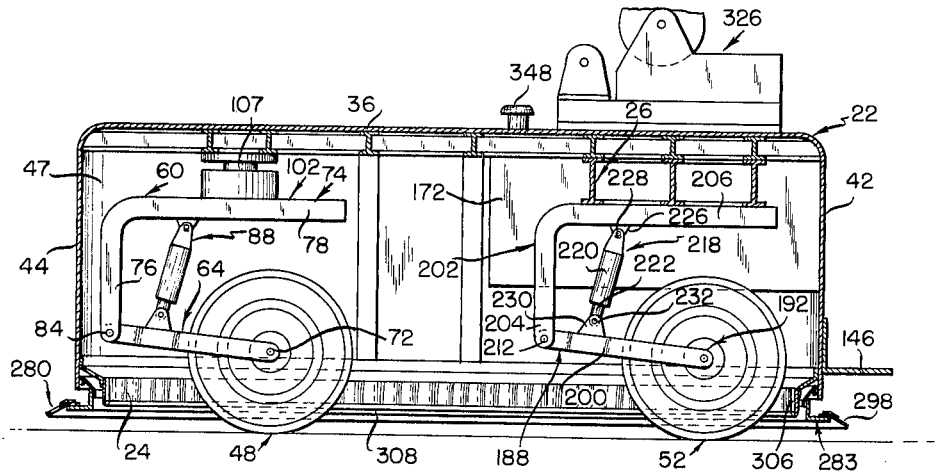
FIGURE 1 is a top plan view showing a wheeled vehicle according to one embodiment of the present invention.

Referring now to the drawings and more particularly to FIGURES 1 and 2, wherein one construction embodying the principles of the present invention is shown, the reference numeral 20 generally designates a lightweight self-propelled wheeled vehicle having a novel box-like body 22 formed with rounded corners and an open bottom 24 (FIGURE 2). Body 22 is of the chassisless type and comprises a rigid skeleton-like base frame 26 which takes the place of an ordinary chassis frame.

As shown in FIGURES 2–4, the top of base frame 26 is formed by a series of longitudinally extending structural beam members 28 which extend from end to end of body 22 and which are secured in spaced apart parallel relationship by a series of transverse structural beam members 30 extending the full width of the vehicle body. Frame 26, as shown, is rectangular in shape with its sides and ends essentially formed by upstanding structural beam members 32 fixed in parallel spaced apart relationship by a series of transverse structural beam members 34.

Suitably fixed to the outer skeleton surfaces of frame 26 are a flat top wall panel 36, opposed parallel spaced apart flat side wall panels 38 and 40 depending perpendicularly from top wall panel 36, and opposed flat end wall panels 42 and 44 extending at right angles between side wall panels 38 and 40 and depending perpendicularly from top wall panel 36. Panels 36, 38, 40, 42 and 44 are preferably of lightweight sheet metal having sufficient thickness to withstand the loads applied thereto.

For a purpose as will presently appear, wall panels 36, 38, 40, 42 and 44 are joined together in the manner shown to form a box-shaped body shell which is imperforate with the general exceptions of a round opening 45 (FIGURE 2) in top wall panel 36 and a louvered opening 46 in end wall panel 42 isolated by partition walls to be hereinafter described. The bottom edges of end wall panels 42 and 44 and of side wall panels 38 and 40 are contained in a common plane extending substantially parallel to the ground surface for a purpose as will presently appear. By this body panel structure, an air evacuation compartment 47 is provided for which is adopted to be evacuated in a manner as well presently be described.

With continued reference to FIGURES 1–4, body 22 is normally supported above the ground by a pair of dirigible wheels 48 and 50 adjacent end wall panel 44 and by a pair of non-dirigible drive wheels 52 and 54 adjacent end wall panel 42. As shown in FIGURES 2, and 3, wheels 48, 50, 52 and 54 partially project through the open bottom 24 by equal distances when the wheels are so positioned to support body 22 clear of the ground surface.

Each of the ground-engaging wheels 48, 50, 52 and 54 are provided with resilient tires 56 which are preferably of the pneumatic type having the necessary load carrying capacity for operation of vehicle 20. Wheels 48, 50, 52 and 54 also are preferably equipped with brakes (not shown) which are of conventional form and which are actuatable by any suitable mechanism (not shown).

For a purpose as will presently appear, dirigible wheels 48 and 50 are retractably mounted on frame 26 by means of castered wheel support and retraction assemblies 60 and 62 as best shown in FIGURES 2, 3 and 7. Assemblies 60 and 62 are substantially identical in construction and each comprises a wheel spindle support section 64 which is integrally formed with a shank portion 66 and yoked end 68 having parallel spaced apart jaws 69 and 70 extending one on each side of its respective dirigible wheel (48, 50). Jaws 69 and 70 carry a wheel mounting spindle 72 for rotatably supporting its respective dirigible wheel (48, 50) about an axis which extends parallel with relation to the ground surface.

With continued reference to FIGURES 2, 3 and 7, the spindle support section 64 of each of the assemblies 60 and 62 is carried by a rigid L-shaped support member 74 having mutually perpendicular arms 76 and 78. Arm 76 extends vertically downwardly between end wall panel 44 and its respective dirigible wheel (48, 50) and terminates in downwardly extending spaced apart jaws 80 and 82 (FIGURE 3) which carry a horizontally extending hinge post 84 for pivotally mounting spindle support section 64. Support section 64 is formed with a bifurcated end 86 opposite from its spindle supporting jaws 69 and 70. Bifurcated end 86 extends between jaws 80 and 82 and is rotatably mounted on post 84 such that the rotational axis of spindle 72 is in parallel spaced apart relationship with the axis of post 84. A sleeve 87 (FIGURE 3) is mounted on hinge post 84 between the arms of bifurcated end 86. By this wheel spindle support structure, it is clear that each of the dirigible wheels 48 and 50 is swingable about the horizontal axis of its respective hinge post 84.

As best shown in FIGURES 2 and 7 each arm 78 of assemblies 60 and 62 extends horizontally above its respective wheel (48, 50) and carries a hydraulic motor unit 88 having a cylinder 90 and an actuator 92 formed rigid with a double acting piston member 93 (FIGURE 8) slidably disposed in cylinder 90. Cylinder 90 is pivotally suspended from a bracket 94 by means of a horizontal post 96 which has its axis extending parallel to the rotational axis of spindle 72. Bracket 94 is fixedly secured to the underside of arm 78 as by any suitable means.

The outer end of actuator 92 extending beyond cylinder 90 is pivotally secured to a bracket 98 by a post 100 which extends parallel to post 96. Bracket 98 is suitably fixed to spindle support section 64 on the upper face of shank portion 66. Thus, with this foregoing wheel spindle support structure, both dirigible wheels 48 and 50 are swingably retractable and extendible about the axes of their respective hinge posts 84 by actuation of power motor units 88.

With continued reference to FIGURES 2 and 7, a king pin journal member 102 is rigidly but removably fixed in any suitable manner to each of the members 74 of assemblies 60 and 62 on the top face of arm 78. Arm 78 is formed with a king pin journal socket portion 104 (FIGURE 5) in vertical alignment with journal member 102.

As best shown in FIGURE 4, journal member 102 and support member 74 rotatably support through suitable bearing assemblies 105 and 106 a vertically suspended king pin 107 which extends downwardly through a cylindrical bore 108 formed in journal member 102 and into an aligned cylindrical bore 110 formed in journal socket portion 104 of member 74. King pin 107 is rigidly fixed to members 28 and 30 of frame 26 and has a reduced diametered cylindrical knuckle mounting section 112 which is journalled in bores 108 and 110 by bearing assemblies 105 and 106. Bearing assemblies 105 and 106 are axially retained spaced apart from each other by a sleeve assembly 118 mounted on cylindrical section 112. Bearing assembly 105 is retained axially in place between sleeve assembly 118 and a radially extending shoulder 120 formed on king pin 107 by a split retainer ring 122 acting against bearing assembly 106 and seated in a groove at the lower end of king pin 107.

As best seen from FIGURE 4, the outer races of bearing assemblies 105 and 106 respectively engage the cylindrical wall surfaces of bores 108 and 110 to journal members 74 and 102 as a unit. Journal member 102 and support member 74 are axially retained in place relative to king pin 107 by axially spaced apart annular lands 124 and 126 which are respectively formed integral with journal member 102 and journal portion 104 and which extend radially inwardly with respect to king pin 107. Land 124 abuttingly extends over the outer race of bearing assembly 105 and land 126 extends inwardly along the downwardly facing surface of the outer race of bearing assembly 106. By this construction, journal member 102 and support member 74 form a combined steering knuckle unit which is journalled and axially retained on king pin 107.

With continued reference to FIGURE 2 and 3, the respective support members 74 for dirigible wheels 48 and 50 are connected together by a tie rod 128 having the usual end connections universally secured to each of the arms 74 of assemblies 60 and 62 in the manner shown.

With continued reference to FIGURES 2 and 4, the steering mechanism for dirigible wheels 48 and 50 may be of any conventional hydraulic type and is shown to comprise a standard reversible rotary fluid steering motor 136 which is fixedly mounted on frame 26 in compartment 47 and which has a downwardly extending power output shaft 138. Two separate flexible hydraulic fluid lines 140 and 142 (FIGURE 3) are connected to motor 136 for furnishing hydraulic fluid to selectively drive output shaft 138 in one direction or the other. Lines 140 and 142 are connected to a manually operable steering control valve unit 144 (FIGURE 2) arranged with its actuator conveniently accessible to the operator of the vehicle who normally stands on a small horizontal platform 146 fixed to frame 26 and extending rearwardly of wall panel 42. Steering control valve 144 may be of any conventional form for selectively furnishing hydraulic fluid from a suitable supply source to drive motor 136 in opposite directions.

With reference now to FIGURES 2-5, shaft 138 carries a pinion 147 which is in constant meshing engagement with a steering gear segment 148. Gear segment 148 is rigidly fixed to journal member 102 of wheel support assembly 62.

By the foregoing wheel support structure, it is clear that wheels 48 and 50 are steerable and also are retractable to positions within compartment 47 as will presently be described in further detail. By selective actuation of valve 144, hydraulic fluid under pressure is admitted either through line 140 or 142 to motor 136 to drive shaft 138 and thereby turn wheels 48 and 50 about their respective king pins 107 with wheel 48 being turned through the connection of tie rod 128.

With reference now to FIGURES 2, 3, 6 and 7, rear drive wheels 52 and 54 respectively are provided with spindles 150 and 152 which are drivingly attached to live axle assemblies 154 and 156 by means of conventional universal joints 158 and 160 respectively. Axle assemblies 154 and 156 respectively have telescoping axle sections 162 and 164 connected by standard universal joints 166 and 168 to a differential gear mechanism which is of conventional form and which is mounted in a differential housing 170.

Differential housing 170 is rigidly mounted beneath a partitioning casing 172 forming with top wall panel 36 and end wall panel 42 a rectangular engine compartment 174. Drive wheels 52 and 54 are driven from a power plant 176 mounted on frame 26 in compartment 174 above differential housing 170.

Power plant 176 comprises an air cooled internal combustion engine 178, a clutch unit 180 operatively connected to one end of a crankshaft 181 (FIGURE 8) of engine 178 and a change speed transmission 182 operatively connected to clutch unit 180 and having an output drive 184 (FIGURE 6) connected to an input gear 186 (FIGURE 6) of the differential mounted within housing 170.

The telescoping axle connections 162 and 164 together with universal joints 158, 160, 166 and 168 make it possible for drive wheels 52 and 54 to be respectively retractable by means of wheel retraction assemblies 188 and 190 which are essentially identical in construction. Each of the wheel retraction assemblies 188 and 190 comprises, as best shown in FIGURES 3 and 7, a wheel spindle support section 192 which is essentially the same as support sections 64 of the front wheel support assemblies 60 and 62 and which is integrally formed with a shank portion 194 and a yoked end 196 having parallel spaced apart jaws 198 and 200 (FIGURES 3 and 6) extending one on each side of its respective drive wheel (52, 54). Jaws 198 and 200 of assembly 188 carry spindle 150 whereas jaws 198 and 200 of assembly 190 carry spindle 152 such that both spindles 150 and 152 extend horizontally in alignment with each other.

Wtih continued reference to FIGURES 2, 3, 6 and 7, spindle support section 192 is carried by a rigid L-shaped member 202 having mutually perpendicular arms 204 and 206. Arm 204 extends vertically downwardly in front of drive wheels 52 and 54 and terminates in downwardly extending spaced apart jaws 208 and 210 (FIGURE 3) which carry a horizontally extending hinge post 212 for swingably mounting section 192. Section 192 is formed with a bifurcated end 214 (FIGURE 3) opposite from its spindle supporting jaws 198 and 200. Bifurcated end 214 extends between jaws 208 and 210 and is rotatably mounted on post 212. A sleeve 215 (FIGURE 3) is mounted on hinge post 212 between the arms of bifurcated end 214. Both of the posts 212 of assemblies 188 and 190 respectively are mounted in alignment with each other and in parallel spaced apart relationship with wheel spindles 150 and 152. By this wheel spindle support structure, drive wheels 52 and 54 are swingable about the horizontal axes of their respective hinge posts 212.

As best shown in FIGURE 7, each arm 206 of assemblies 188 and 190 is fixed to frame 26 above its respective drive wheel (52, 54) and carries a hydraulic motor unit 218 having a cylinder 220 and an actuator 222 formed rigid with a double acting power piston 224 (FIGURE 8) slidably disposed in cylinder 220. Cylinder 220 is pivotally suspended from a bracket 226 by means of a horizontal post 228 which has its axis extending parallel to the axis of hinge post 212. Bracket 226 is fixedly secured to arm 206 by any suitable means.

The outer end of actuator 222 extending beyond cylinder 220 is pivotally secured to a bracket 230 by a post 232 which extends parallel to post 228. Bracket 230 is suitably fixed to section 192 on the upper face of shank portion 194.

Thus, by the foregoing hydraulic motor unit and spindle support structure, it is clear that drive wheels 52 and 54 are swingably retractable and extendible about the axes of their respective hinge posts 212 by actuation of the hydraulic motor units 218.

The hydraulic system for operating motor units 88 and 218 may be of any suitable type such as, for example, that shown in FIGURE 8 wherein introduction of hydraulic fluid under pressure into cylinders 90 of assemblies 60 and 62 and into cylinders 220 of assemblies 188 and 190 is controlled by a manually operable reversing valve 236. Valve 236 is of the type having an inlet port 238, two distinct actuating ports 240 and 242, an exhaust port 244, and a manually rotatable valve plug 246 formed with independent plug passages 248 and 250. Valve 236 is operable to one of three positions: (1) a "neutral" position in which there is no transfer of fluid from inlet port 238 to actuating ports 240 and 242; (2) a first "operative" position in which inlet port 238 is connected to port 240 by plug passage 248, and exhaust port 244 is connected to port 242 by plug passage 250; and (3) a second "operative" position in which inlet port 238 is connected to port 242 by plug passage 248, and exhaust port 244 is connected to port 240 by plug passage 250. Valves of this type are sometimes referred to as "four-way valves" and are of conventional construction as shown in the United States Letters Patent No. 1,263,778 issued April 23, 1918 to C. W. Larner.

With continued reference to FIGURE 8, inlet port 238 is connected by means of a conduit 252 to the discharge of a hydraulic pump 254 which has its inlet connected to a hydraulic fluid reservoir 256 by means of a conduit 258. Pump 254 is mounted on the housing of engine 178 and is drive connected to the output of a transmission 259. Transmission 259 is operatively connected through a clutch unit 260 to the end of crankshaft 181 opposite from clutch unit 180. Thus, with clutch unit 260 engaged, operation of engine 178 drives pump 254 to supply hydraulic fluid under pressure to inlet port 238 of valve 236.

Port 240 is connected for fluid communication with the upper ends of cylinders 220 of assemblies 188 and 190 by a header conduit 261 and branch conduits 262 intersecting header conduit 261. Port 240 also is connected for fluid communication with the upper ends of cylinders 90 of assemblies 60 and 62 by means of branch conduits 263 which interconnect header conduit 261 with the upper ends of cylinders 90 above pistons 93.

Similarly, port 242 is connected to the lower ends of cylinders 90 of assemblies 60 and 62 and to the lower ends of cylinders 220 of assemblies 188 and 190 by means of a header conduit 264 and branch conduits 265 intersecting header conduit 264. Fluid communication between exhaust port 244 and reservoir 256 is established by means of a conduit 272.

Figure 9:
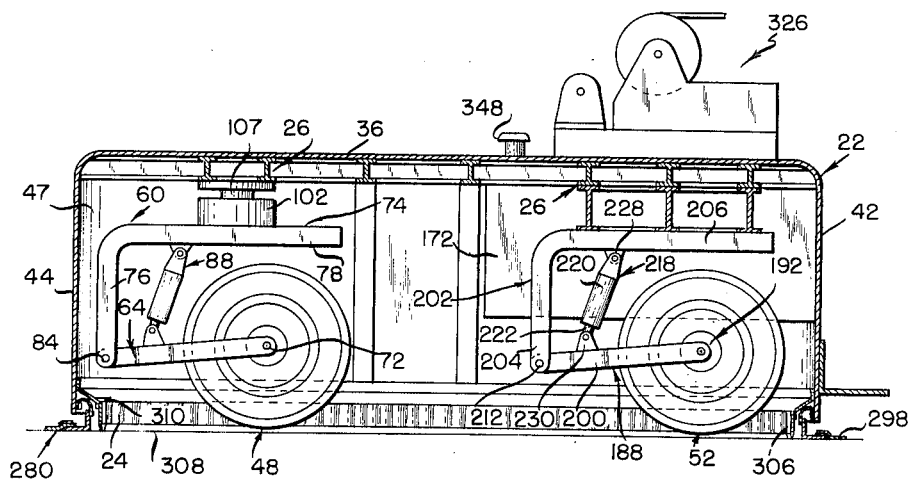
FIGURE 9 is a sectioned view similar to FIGURE 7 but showing the wheels of the vehicle retracted to position within the body of the vehicle with the body of the vehicle lowered to a resting position on the vehicle support surface.

When wheels 48, 50, 52 and 54 are fully extended, they project partially through the open bottom 24 of body 22 to support body 22 on a level and clear of the ground surface in the manner shown in FIGURES 2 and 7. When wheels 48, 50, 52 and 54 are fully retracted, as shown in FIGURE 9, the vehicle rests on a continuous sealing unit 280 which, as will presently be described in detail, is mounted on body 22 adjacent to the bottom edges of wall panels 38, 40, 42 and 44 around the periphery of open bottom 24. In their fully retracted positions, it is clear that wheels 48, 50, 52 and 54 are completely disposed within compartment 47.

By retracting wheels 48, 50, 52, and 54 to the positions shown in FIGURE 9, sealing unit 280 engages the ground surface to form an endless ground-engaging seal between body 22 and the ground surface so as to sealingly confine the space within which wheels 48, 50, 52 and 54 are disposed and enable the evacuation of compartment 47 by means as will be presently described.

To extend wheels 48, 50, 52 and 54 from retracted positions within compartment 47 to positions where they project partially through the open bottom 24 and support body 22 clear of the ground surface, valve plug 246 is turned to its first "operative" position as previously described and shown in FIGURE 8, and engine 178 is operated to drive pump 254. Hydraulic fluid under pressure is thereby admitted simultaneously into cylinders 90 and 220 above pistons 93 and 224 respectively to displace pistons 93 and 224 downwardly and simultaneously swing wheels 48, 50, 52 and 54 downwardly about the axes of their respective hinge posts 84 and 212 until the wheels engage the ground surface. Upon introduction of further pressurized hydraulic fluid into cylinders 90 and 220, the reaction of wheels 48, 50, 52 and 54 against the ground surface displaces cylinders 90 and 220 upwardly to raise body 22 clear of the ground surface to the position shown in FIGURES 2 and 7.

While hydraulic fluid under pressure is being admitted to cylinders 90 and 220 above pistons 93 and 224 respectively, any hydraulic fluid in cylinders 90 and 220 below pistons 93 and 224 is exhausted through conduit 264, plug passage 250, conduit 272 to reservoir 256. By turning valve plug 246 to its "neutral" position as previously described, port 238 is sealed off by plug 246 and the pressurized hydraulic fluid is trapped in cylinders 90 and 220 above pistons 93 and 224 so as to hold wheels 48, 50, 52 and 54 in their extended positions with body 22 raised above the ground in the manner shown in FIGURES 2 and 7.

When it is desired to retract wheels 48, 50, 52 and 54 so as to lower body 22 to the position shown in FIGURE 9 where sealing unit 280 engages the ground surface, valve plug 246 is turned to its second "operative" position as previously described. As a result, fluid communication is established between the upper ends of cylinders 90 and 220 above pistons 93 and 224 respectively and reservoir 256 through plug passage 250.

In the second "operative" position of plug 246, fluid communication is also established between the lower ends of cylinders 90 and 220 below pistons 93 and 224 and pump 254 through plug passage 248. Thus, by driving pump 254, pressurized hydraulic fluid is supplied to the lower ends of cylinders 90 and 220 below pistons 93 and 224, and hydraulic fluid in the upper ends of cylinders 90 and 220 above pistons 93 and 224 is exhausted through conduit 261 to reservoir 256. As a result, cylinders 90 and 220 are displaced downwardly until sealing unit 280 is brought to rest on the ground surface to support the vehicle. Further introduction of pressurized hydraulic fluid into the lower ends of cylinders 90 and 220 below pistons 93 and 224 causes pistons 93 and 224 to be displaced upwardly to simultaneously lift wheels 48, 50, 52, and 54 clear of the ground.

With reference now to FIGURES 1 to 3, sealing unit 280 has two sealing sections 281 and 282 (FIGURES 10 through 14) for establishing a dual seal around the periphery of open bottom 24. Sealing section 281 comprises a rigid endless loading rim 283 which is of rectangular shape and which extends partially beyond side and end wall panels 38, 40, 42 and 44 in the manner shown. Loading rim 283 is made up from suitable lengths of "L" angle irons thus providing for a uniform L-shaped cross section with a vertical plate portion 284 and a horizontal plate portion 286 integrally perpendicular with vertical plate portion 284 as best seen in FIGURE 10.

Loading rim 283 is mounted on body 22 by means of an endless flexible sealing diaphragm 288 which is formed from wire woven neoprene or rubber strip. As best shown in FIGURE 10, the upper marginal edge portion of diaphragm 288 is folded downwardly and is clamped between the inwardly facing surfaces of wall panels 38, 40, 42 and 44 and an endless rigid rectangular band 290. Band 290 may be made up of suitable lengths of elongated rigid plate sections and is fixedly secured to body 22 adjacent to the bottom edges of wall panels 38, 40, 42 and 44 by means of screws 292 or the like. By this construction, the upper marginal edge of diaphragm 288 is firmly clamped between body 22 and band 290 to form an endless fluid tight seal with the inwardly facing surfaces of wall panels 38, 40, 42 and 44.

With continued reference to FIGURE 10 diaphragm 288 folds downwardly over the upper edge of band 290. The lower marginal edge of diaphragm 288 is clamped between vertical plate portion 284 of loading rim 283 and a rigid metal band 294 having a rectangular shape interfittingly corresponding to that of loading rim 283. Band 294 is fixedly secured to vertical plate portion 284 adjacent the upper edge thereof by screws 295 or the like and has an outer flat face which is pressed firmly against the lower marginal edge of diaphragm 288 so that diaphragm 288 is clamped securely between the outer face of band 294 and the inner face of vertical plate portion 284. By this construction, diaphragm 288 forms an endless fluid tight seal with loading rim 283. As a result, a flexible seal between body 22 and loading rim 283 is established by diaphragm 288 for a purpose as will presently become apparent.

With continued reference to FIGURES 1, 2, 3, 10 and 11, an endless flexible sealing rim 298 of rubber strip or other suitable material is fixed to the outer end of horizontal plate portion 286 of loading rim 283 by means of a series of screws 300 and an endless rigid band 302. Screws 300 secure sealing rim 298 and band 302 to plate portion 286 with sealing rim 298 clamped firmly between band 302 and the upper surafce of plate portion 286. Sealing rim 298 may be made up from a single strip with its ends joined together or it may be made up from a plurality of segments joined together to form an endless seal.

Sealing rim 298 extends beyond the outer edge of plate portion 286 and is engageable with the vehicle supporting surface as shown in FIGURES 12 and 13 when body 22 is lowered by retraction of wheels 48, 50, 52 and 54 to positions within compartment 47. Sealing rim 298 is pressed against the vehicle supporting surface by atmospheric pressure to form an endless fluid tight seal in surrounding relationship to the open bottom 24 when compartment 47 is evacuated.

With continued reference to FIGURES 1, 2, 3, 10 and 11, sealing section 282 comprises an endless sinously shaped rigid anchoring blade 306 having a knife-like edge 308 facing the ground. Anchoring blade 306 preferably is formed with a configuration corresponding to a sine wave as best seen in FIGURE 11. Anchoring blade 306 has a generally rectangular shape corresponding to that of loading rim 283 and is arranged to extend through the rectangular opening formed by loading rim 283 in spaced apart relationship to vertical plate portion 284. Anchoring plate 306 projects partially below the bottom edges of wall panels 38, 40, 42 and 44 and is rigidly fixed to body 22 by a rigid endless skirt 310 of rectangular shape.

As best shown in FIGURE 10, skirt 310 is formed in cross section with an upper vertical end section 312 integrally joined to a lower vertical end section 314 by an intermediate diagonally extending section 316 with each of the three sections 312, 314 and 316 having opposed flat sides. As shown, end section 312 extends upwardly from intermediate section 316 and is parallel with lower end section 314 which depends downwardly from intermediate section 316. Intermediate section 316 slopes downwardly and inwardly from end section 312 in the manner shown.

With continued reference to FIGURE 10, skirt 310 is fixed to body as by welding with the outwardly facing surface of end section 312 interfittingly abutting the inner surface of wall panels 38, 40, 42 and 44 to form an endless fluid tight seal with body 22. Anchoring blade 306 extends partially through the rectangular opening formed by skirt 310 and is fixedly secured to lower end section 314 as by an upper set of screws 318 and by a lower set of screws 319 as shown in FIGURE 12.

Clamped securely between anchoring blade 306 and section 314 of skirt 310 is an endless resilient gasket 320 (FIGURES 10 and 11) for preventing leakage of air between anchoring blade 306 and skirt 310. Gasket 320 is formed with an inwardly facing surface 321 (FIGURE 11) having a sinuous configuration conforming to the sinuous configuration of anchoring blade 306 and in intimate interfitting contact with the outwardly facing surface of anchoring blade 306 to form therewith an endless fluid tight seal. The outwardly facing surface of gasket 320 is in interfitting intimate contact with the inwardly facing surface of skirt section 314 to establish an endless fluid tight seal with skirt 310. Gasket 320 is clamped in place by screws 318 which extend through anchoring blade 306 and through gasket 320 for threaded engagement in skirt section 314.

As best shown in FIGURE 10, the top face of gasket 320 is approximately flush with the top edge of blade 306 and the bottom face of gasket 320 is about midway between screws 318 and screws 319. Screws 319 are provided with washers 322 (FIGURE 12) pressed between blade 306 and skirt section 314 to maintain anchoring blade 306 parallel with skirt section 314 in the manner shown.

Thus, it is clear that anchoring blade 306 cooperates with skirt 310 and gasket 320 to form an imperforate rigid endless extension of body 22 with knife edge 308 defining the periphery of open bottom 24.

When vehicle 20 is being moved about, wheels 48, 50, 52 and 54 are in their fully extended positions with loading rim 283 and anchoring blade 306 raised clear of the ground support surface as shown in FIGURES 2, 7 and 10. In this position, loading rim 283 is suspended from body 22 by diaphragm 288 with horizontal plate portion 286 extending outwardly at a slightly lower elevation than knife edge 308. Thus, as body 22 is lowered, loading rim 283 will engage the ground surface before knife edge 308 for a purpose as will presently become apparent.

When it is desired to position vehicle 20 for some operation such as, for example, hauling aircraft or other objects by means of a conventional winch 326 mounted on the top of body 22, wheels 48, 50, 52 and 54 may be retracted to one of three different positions depending upon the desired application and upon the character of the vehicle supporting surface.

Where the surface is hard and generally flat such as, for example, an air strip or a deck of a marine vessel indicated at 328 (FIGURES 12 and 13), and where the load to be moved by vehicle 20 is comparatively nominal, wheels 48, 50, 52, and 54 are retracted just sufficiently to lower loading rim 283 to a position where it rests firmly on vehicle supporting surface 328 in the manner shown in FIGURE 12. In this position as shown in FIGURE 12, sealing rim 298 is in intimate contact with the vehicle support surface 328 with the bottom edges of body 22 and the knife edge 308 of anchoring blade 306 respectively spaced vertically above horizontal plate portion 286 of loading rim 283 and surface 328. With the component parts of sealing unit 280 thus positioned, sealing rim 298 cooperates with loading rim 283 and diaphragm 288 to establish an endless fluid tight seal between surface 328 and body 22 in surrounding relationship to open bottom 24. As a result, the compartment 47 is confined to enable the evacuation of air from compartment 47 by means as will presently be described.

Where it is desired to move loads greater than the comparatively nominal loads mentioned above and the vehicle support surface is hard such as a ship's deck 328, wheels 48, 50, 52, and 54 are retracted to a greater distance within compartment 47 so as to lower body 22 and sealing unit 280 to the positions shown in FIGURE 13. In the position of component parts shown in FIGURE 13, loading rim 283 rests on surface 328 with sealing rim 298 in intimate contact with surface 328 in the same manner as described with respect to the position of parts in FIGURE 12. The bottom edges of body 22 are shown still to be spaced vertically above horizontal plate portion 286. Anchoring blade 306, however, is now lowered from the position shown in FIGURE 12 to a position where its knife-edge 308 firmly contacts surface 328 thus establishing an endless knife-edged fluid tight seal with surface 328 to sealingly confine compartment 47 with vehicle support surface 328. As a result, it will be appreciated that with the position of parts shown in FIGURE 13, two separate continuous seals are formed one within the other with the outer seal being established by sealing rim 298 and the inner seal being established by anchoring blade 306. Since anchoring blade 306 extends below the bottom edges of body wall panels 38, 40, 42, and 44 and is rigid with body wall panels 38, 40, 42 and 44 to thus form a part of body 22, vehicle 20 is frictionally supported jointly by wheels 48, 50, 52 and 54 and by anchoring blade 306 when body 22 is lowered to the position shown in FIGURE 13. The engagement of the lower edges of frame 26 with the endless upper edge of anchoring blade 306 makes it possible to relieve screws 318 and 319 of stress when anchoring blade 306 is in position to support the weight of vehicle 20.

Where the vehicle surface is soft such as natural earth terrain indicated at 330 in FIGURE 14, wheels 48, 50, 52 and 54 are fully retracted to positions within compartments 47 so as to lower body 22 sufficiently to embed anchoring blade 306 in the earth 330 as shown in FIGURE 14. The vertical offset between knife edge 308 and the bottom edges of body wall panels 38, 40, 42 and 44, which are contained in a common horizontal plane as previously described, makes it possible for anchoring blade 306 to penetrate terrain 330 by a predetermined vertical distance before the bottom edges of wall panels 38, 40, 42 and 44 are lowered into engagement with the upper surface of horizontal plate portion 286 of loading rim 283. Consequently, with initial penetration of anchoring blade 306 into terrain 330, the bottom edges of wall panels 38, 40, 42 and 44 remain spaced vertically above plate portion 286 so that the weight of vehicle 20 is supported by anchoring blade 306.

When wheels 48, 50, 52 and 54 are retracted a further distance so that they substantially clear the surface of terrain 330, wall panels 38, 40, 42 and 44 are lowered sufficiently to rest with their bottom edges on horizontal plate portion 286 of loading rim 283 in the manner shown in FIGURE 14. In this position, the weight of vehicle 20 is jointly supported by anchoring blade 306 and loading rim 283 with wheels 48, 50, 52 and 54 being retracted to positions substantially clear of the ground. As a result, it will be appreciated that loading rim 283, in addition to mounting sealing rim 298, also supports part of the weight of vehicle 20 when wheels 48, 50, 52 and 54 are fully retracted. Loading rim 283 also prevents wall panels 38, 40, 42 and 44 from sinking into the ground when body 22 is fully lowered.

By penetration of anchoring blade 306 into the terrain, an endless seal around the periphery of open bottom 24 is assured even through the vehicle may be on uneven surfaces which preclude sealing rim 298 from intimately contacting the ground surface at all points.

Flexible diaphragm 288, in addition to establishing a fluid tight seal between body 22 and loading rim 283, cooperates with body 22 and loading rim 283 to make it possible for body 22 to move downwardly relative to loading rim 283 after loading rim 283 is lowered to its resting position on the ground surface as shown in FIGURE 12.

The area of horizontal plate portion 286 in contact with the ground surface makes it possible to sufficiently distribute the weight of vehicle 20 supported by loading rim 283 to substantially prevent loading rim 283 from sinking into the ground by application of the weight of the vehicle. As a result, no difficulty is encountered in extending wheels 48, 50, 52 and 54 to raise body 22 clear of the ground surface even though the terrain is comparatively soft.

With anchoring blade 306 penetrated into terrain 330 as shown in FIGURE 14, two separate endless fluid tight seals are established one within the other in the same manner as described with respect to FIGURE 13.

After an endless seal is established by either sealing section 281 alone or by sealing section 281 together with sealing section 282, air in compartment 47, which is now confined, is evacuated by means of an air exhaust compressor 336 shown in FIGURE 2. Compressor 336 is connected to be driven with pump 254 by engine 178 and has an inlet 338 connected to an air intake duct 340 which extends with a tight fit through an opening 342 formed in casing 172. By this power plant construction, pump 254 and compressor 336 are driven as a unit. By selective actuation of clutch units 180 and 260, pump 254 and compressor 336 may be driven independently of the drive to wheels 52 and 54, thus permitting the operation of pump 254 and compressor 336 when vehicle 20 is in a stable position.

With continued reference to FIGURE 2, air evacuated from compartment 47 by compressor 336 is discharged from an outlet port 344 which opens into the interior of casing 172. Casing 172 forms, in effect, a plenum chamber as indicated at 174 and the air discharged into this chamber is exhausted to the surrounding atmosphere through louvered opening 46 which is enclosed in chamber 174 by casing 172. As shown, casing 172 is generally box-shaped and isolates chamber 174 from compartment 47 permitting introduction of air from compartment 47 only through intake duct 340.

With continuing reference to FIGURE 2, a by-pass air inlet duct 346 intersects duct 340 and extends upwardly through opening 45 in top wall panel 36 of body 22. Duct 346 projects beyond body 22 and has a suitable air inlet hood 348 mounted on its upper end in the manner shown. Arranged in duct 346 is a pivotally mounted butterfly valve 350. Valve 350 controls the passage of air through duct 340 and is automatically actuated by means of a condition-responsive operator 352. Operator 352 may be of any suitable type for maintataing valve 350 in closed position when air in chamber 174 is at a sufficiently low temperature to cool engine 178 and for opening valve 350 to admit air to compressor 336 through duct 346 when the temperature of the air in chamber 174 rises above a predetermined value. This operation of valve 350 may be accomplished by means of a thermal bulb 354 containing a suitable temperature responsive fluid and connected to valve 350 by means of a suitable linkage 356.

The foregoing novel duct arrangement makes it possible to utilize the air evacuated from compartment 47 to cool motor 178. As long as sufficient air to cool engine 178 is passed through chamber 174 during evacuation of compartment 47, valve 350 remains closed under the control of operator 352. When the air supply in compartment 47 is depleted as a result of evacuation and the rate of movement of air through chamber 174 is thereby reduced to cause the temperature in chamber 174 to increase by continued operation of engine 178, valve 350 is opened to admit a fresh supply of air to compressor 336 through duct 346 for cooling engine 178. Thus, the need for separate air compressors or fans to cool engine 178 and to facilitate evacuation of compartment 47 is eliminated.

By lowering body 22 to establish an endless seal around the periphery of the open bottom 24 and by evacuating the air confined within compartment 47, a pressure differential depending upon the amount of air evacuated is created across body 22 to increase the effective weight of vehicle 20 by an appreciable magnitude. As a result, a force is developed by application of atmospheric pressure on the flat top of body 22 to oppose those forces acting on vehicle 20 which tend to move the vehicle along the ground surface or to tilt it in any direction. The inverted shell-like shape of body 22 makes it possible to form evacuation compartment 47 with an exceptionally large top surface area on which the atmospheric pressure acts. As a result of using the vehicle body to form evacuation compartment 47 and by providing for such a large top surface, correspondingly large atmospheric-pressure-weighted forces are established by evacuating compartment 47.

By mounting wheels 48, 50, 52 and 54 within evacuation compartment 47 and by providing for a top surface on body 22 which extends appreciably beyond wheels 48, 50, 52 and 54 as best seen in FIGURE 3, atmospheric pressure exerts forces on body 22 outwardly beyond wheels 48, 50, 52 and 54 in all directions to effectively oppose upsetting forces acting to fulcrum the vehicle about its wheels. Thus, the atmospheric-pressure-weight force pattern established by the construction of body 22 in cooperation with the novel sealing unit 280 provides for an appreciable resistance against movement of the vehicle from a stable position. Since the wheels of vehicle 20 are non-yieldingly connected to frame 26, the full atmospheric-pressure-weighted forces applied to body 22 are fully effective to increase the adherent force of vehicle 20 relative to the support surface.

By constructing vehicle 20 with a chasisless body, the actual weight of the vehicle is appreciably reduced which is particularly beneficial in transporting the vehicle or using it aboard marine vessels. It will be appreciated that the normal weight or actual mass of vehicle 20 may be appreciably less than the usual weight necessary for establishing effective traction forces since evacuation of compartment 47 provides for a considerable increase in the effective weight of the vehicle, thus enabling the vehicle to perform useful functions as previously described.

Furthermore, partial retraction of the wheels to engage seal rim 298 alone with a ship's deck or like smooth support surface may be temporarily resorted to while the vehicle is driven slowly to inch the vehicle along to minimize the displacement effects due to a rough sea.

FIGURES 15–22 illustrate a modification if the invention in which body 22 of the vehicle shown in FIGURES 1–14 is partitioned to form multiple evacuation compartments 360, 362, 364 and 366 in which wheels 48, 50, 52 and 54 are respectively disposed. Like reference numerals throughout FIGURES 1–22 identify like parts.

The embodiment illustrated in FIGURES 15–22 and incorporating the multiple compartments 360, 362, 364, and 366 is particularly useful where the terrain is uneven and consequently likely to create difficulty in establishing an endless seal over widespread surfaces of the terrain. As will presently be described in detail, compartments 360, 362 364 and 366 are individually provided with separate sealing units replacing the single sealing unit 280 described in the embodiment of FIGURES 1–14. If the terrain is uneven so as to preclude the establishment of an endless seal around the open bottom of one or more of the compartments 360, 362, 364 and 366 to prevent the evacuation of air from that compartment, the remaining compartments may still be evacuated to increase the effective weight of the vehicle by means as will be presently described.

As best shown in FIGURE 16, compartments 360, 362, 364, and 366 are formed by dividing the interior of body 22 with an upstanding longitudinal partition 368 and two upstanding transverse partitions 370 and 372. Partition 368 extends from one end of body 22 to the other end thereof at right angles to end wall panels 42 and 44 and midway between side wall panels 38 and 40. Partition 370 extends at right angles between side wall panel 38 and partition 368 midway between end wall panels 42 and 44. Partition 372 aligns with partition 370 and extends at right angles between partition 368 and side wall panel 40.

As shown in FIGURES 16 and 20, tie rod 128 extends through an elongated aperture 374 formed in partition 368 to allow movement of the tie rod 128 with wheels 48 and 50 when the wheels are retracted and extended or turned in opposite directions by steering motor 136. A corregated generally conically shaped flexible boot 376 made of rubber or other suitable air impervious flexible material is mounted in compartment 360 in surrounding clamped relationship to tie rod 128 to prevent leakage of air in either direction through opening 374.

With continued reference to FIGURE 16, boot 376 surrounds opening 374 with its base fixed in fluid tight relationship to partition 368 as by an adhesive or a clamp ring (not shown). The tip of boot 376 is secured fluid tight to the periphery of tie rod 128 in any suitable well known manner. By this flexible boot construction, leakage through opening 374 is prevented without interferring with the movement of the tie rod 128.

As shown in FIGURES 16 and 18, differential housing 170 which is rigid with respect to casing 172 extends through partition 368 with a fluid tight fit such that one half of the housing is disposed in compartment 366 and the other half of the housing is disposed in compartment 364.

As shown in FIGURES 15, 16, 17, 18 and 21, compartments 360, 362, 364 and 366 are respectively provided with sealing units 379, 380, 381 and 382 which are of the same construction as sealing unit 280 incorporated in the embodiment of FIGURES 1–14 with like reference numerals identifying like component parts.

With reference to FIGURE 17a, a rigid skirt 384 is fixed to partition 368 adjacent the bottom edge thereof and extends continuously and perpendicularly between partition 370 and end wall 44. Skirt 384 has a shape corresponding to that of skirt 310 previously described and is formed with two vertical arm portions 384a and 384b arranged in parallel spaced apart relationship and integrally joined by a diagonal portion 384c extending downwardly and inwardly into compartment 360 below the bottom edge of partition 368. Arm portion 384b extends below the bottom edge of partition 368 and is adapted to mount sealing unit 379 as will be presently described.

As shown in FIGURE 17, a skirt 385 is fixed to partition 370 and is the same construction as skirt 384 with like reference numerals identifying like parts. Skirt 385 extends continuously between partition 368 and side wall panel 38.

Diaphragm 288 of sealing unit 379 is fixedly secured by band 290 as previously described to form an endless seal with skirts 384 and 385 and with the portions of wall panels 38 and 44 forming compartment 360. Skirt 310, mounting endless anchor blade 306, is fixed in fluid tight relationship to partition 370 and to the portions of side wall panel 38, end wall panel 44 and partition 368 forming compartment 360. Thus, it is clear that sealing unit 379 is engageable with the vehicle support surface to establish a single endless seal or and endless dual seal in the manner previously described with respect to the embodiment of FIGURES 1–14. The bottom edges of skirts 384 and 385 and the portions of the bottom edges of panels 38 and 44 forming compartment 360 are contained in a common plane for concomitant engagement with the top face of the loading rim arm portion 286 when body 22 is lowered to a position corresponding to that shown in FIGURE 14.

Referring now to FIGURE 15a, a rigid skirt 386 extending into compartment 362 is fixed to partition 372 and is of the same construction as skirt 384 with like reference numerals identifying like parts. A further rigid skirt 387 extending into compartment 362 is fixed to partition 368 and is of the same construction as skirt 384. Skirt 386 extends continuously between side wall panel 40 and partition 368, and skirt 387 extends continuously between end wall panel 44 and partition 372.

Diaphragm 288 of sealing unit 380 is fixed by band 290 to form an endless fluid tight seal with skirts 386 and 387 and with the portions of wall panels 40 and 44 forming compartment 362. Skirt 310 of sealing unit 380 is fixed in fluid tight relationship to partition 372 and to the portions of side wall panel 40, end wall panel 44 and partition 368 forming compartment 362. The bottom edges of skirts 386 and 387 and of panels 40 and 44 are contained in the same plane for concomitant engagement with loading rim 283 of sealing unit 380 for a purpose as previously explained.

With reference to FIGURES 17 and 18, a rigid skirt 388 extending into compartment 364 is fixed to partition 370 and is of the same construction as skirt 384. Similarly, a skirt 389 extending into compartment 364 is fixed to partition 368 and is of the same construction as skirt 384. Skirt 388 extends continuously between side wall panel 38 and partition 368, and skirt 389 extends continuously between partition 370 and end wall panel 42. The bottom edges of skirts 388 and 389 and of panels 38 and 40 are contained on a common plane for concomitant engagement with loading rim 283 of sealing unit 381.

Diaphragm 288 of sealing unit 381 is fixed by band 290 to form an endless fluid tight seal with skirts 388 and 389 and the portions of panels 38 and 42 forming compartment 364. Skirt 310 of sealing unit 381 is fixed in fluid tight relationship to partition 370 and to the portions of side wall panel 38, end wall panel 42 and partition 368 forming compartment 364.

As shown in FIGURES 15a and 18, a skirt 390 extending into compartment 366 is fixed to partition 372 and is of the same construction as skirt 384. Similarly, a skirt 390a extending into compartment 366 is fixed to partition 368. Skirt 390a extends continuously between partition 372 and panel 42, and skirt 390 extends continuously between partition 368 and panel 40 with the bottom edges of skirts 390 and 390a together with the bottom edges of panels 40 and 42 being contained in a common plane for concomitant engagement with loading rim 283 of sealing unit 382.

Diaphragm 288 of sealing unit 382 is fixed by band 290 to form an endless seal with skirts 390 and 390a and with the portions of panels 40 and 42 forming compartment 364. Skirt 310 of sealing unit 382 is fixed in fluid tight relationship to partition 372 and to the portions of side wall panel 40, end wall panel 42 and partition 368 forming compartment 366.

With the foregoing ground-engaging sealing arrangement, it is clear that by lowering body 22 in the manner previously described in the embodiment of FIGURES 1–14, sealing units 379, 380, 381 and 382 are engageable with the ground surface to establish a single endless seal or an endless dual seal in surrounding relationship to the open bottoms of compartments 360, 362, 364 and 366 respectively. Thus, when body 22 is lowered sufficiently to enable sealing units 379, 380, 381 and 382 to engage the vehicle support surface, the support surface cooperates with wall panels 36, 38 and 44, with partitions 368 and 370, with skirts 384 and 385 and with a casing 392, which will later be described, to confine compartment 360. Similarly, the support surface cooperates with panels 36, 40 and 44, with partitions 368 and 372, with skirts 386 and 387 and with casing 392 to confine compartment 362.

Also, the vehicle support surface cooperates with wall panels 36, 38, and 42, with partitions 368 and 370, with skirts 388 and 389, and with casings 172 and 392 to confine compartment 364. Similarly, the vehicle support surface cooperates with wall panels 36, 40 and 42, with partitions 368 and 372, with skirts 390 and 390a, and with casings 172 and 392 to confine compartment 366.

By confining the space enclosed by compartments 360, 362, 364 and 366, the air within compartments 360, 362, 364, and 366 may be evacuated by compressor 336 in the manner previously described.

Where the vehicle supporting surface is uneven to prevent one or more of units 379, 380, 381 and 382 from establishing an unbroken endless seal with the ground surface to thereby allow leakage of air into one or more of the compartments, an evacuation valve unit 391 is provided by one wall of casing 392 to facilitate the evacuation of the remaining evacuation compartments into which there is no leakage of air.

With reference to FIGURES 15a, 16, 21 and 22, valve unit 391 comprises one wall of casing 392 which is fixed to frame 26 adjacent to the front end of the power plant casing 172. The interior of casing 392 is divided by a rigid horizontal partition 394 (FIGURE 15a) to form an upper chamber 396 into which the open end of intake duct 340 extends for establishing fluid communication between compressor inlet port 338 (FIGURE 15) and chamber 396. The chamber space below partition 396 is divided into four valve inlet chambers 398, 400, 402 and 404 (FIGURE 22) by means of an imperforate upstanding partition 406 extending perpendicularly to aligned upstanding imperforate partitions 407 and 408.

Valve inlet chambers 398, 400, 402, and 404 respectively are in fluid communication with upper chamber 396 through apertures 410, 412, 414 and 416 formed in partition 394 which is otherwise imperforate. As a result, fluid communication between inlet chambers 398, 400, 402 and 404 may be established only through upper chamber 396 during evacuation of compartments 360, 362, 364 and 366. Chambers 398, 400, 402 and 404 respectively are in fluid communication with evacuation compartments 360, 362, 364 and 366 through screened openings 418, 420, 422 and 424 (FIGURES 16, 15a and 22) formed in an otherwise imperforate bottom wall 426 (FIGURE 15a) of casing 392. Mounted over each of the openings 418, 420, 422 and 424 is an air cleaner which is generally indicated at 428 (FIGURES 15a and 22) and which may be of any suitable conventional form.

Controlling the passage of air through openings 410, 412, 414, and 416 respectively are valve assemblies 430, 432, 434 and 436. Valve assemblies 430, 432, 434 and 436 are of the same construction and, as best shown in FIGURE 19, each valve assembly comprises a valve seat member 438 mounted in each of the openings 410, 412, 414 and 416 with a downwardly facing sloped seating surface 440. Formed integrally with valve seat member 438 is an upstanding valve stem supporting extension 442 which extends upwardly in chamber 396 and which has a smooth vertical bore 444. Slidably mounted in bore 444 is a cylindrical valve stem 446 which extends beyond bore 444 at both ends and which terminates in a threaded end section 448 above extension 442. A nut 450 is threadedly secured to end section 448 and is arranged to about the top surface of extension 442 to limit the downward travel of stem 446.

Rigidly fixed to the lower end of valve stem 446 is a valve closure member 452 having a sloped seating surface 454 arranged to interfittingly engage with valve seat 440 in valve closed position. Valve closure member 452 is generally conical in shape and is formed with a small flat top surface 456 of predetermined area and an enlarged bottom surface having a concave recess 458. Disposed between extension 442 and top surface 456 of valve closure member 452 is a coiled spring 460 which surrounds stem 446 and which reacts against extension 442 to normally urge closure member 452 downwardly to its valve opened position as shown in FIGURE 19.

Thus, when the air pressure in chamber 396 is approximately equal or greater than the air pressure in chambers 398, 400, 402, and 404, the valve closure members 454 are biased open by springs 460 and extend into chamber 398, 400, 402 and 404, being held by their springs 460 in the valve opened position shown in FIGURE 19 to allow passage of air from evacuation compartments 360, 362, 364 and 366 to chamber 396. When compressor 336 is actuated a positive flow of air from chambers 398, 400, 402 and 404 through chamber 396 to compressor 336 occurs with an incident lowering of the pressure in chamber 396 due to the restricted flow passages around closure members 452 and a proportional lowering of pressure in the respective sealed chambers 398, 400, 402 and 404 to effectively evacuate all sealed chambers. However, should one of these chambers be ineffectively sealed, the air flow past its control valve will accelerate sufficiently to increase the pressure drop to a point sufficient to overcome the biasing effect of the spring with the result that the valve for the leaking chamber (for example, the chamber 398) will close and the pressure in the leaking chamber will rise to atmospheric pressure due to the leakage of air to firmly seat the valve member.

The closure members 452 of the remaining valve assemblies 432, 434 and 436, however, will be acted upon by a diminishing pressure and their springs will act to maintain them in open position permitting full evacuation of air from chambers 400, 402 and 404. Consequently, the failure of sealing unit 379 to establish an endless seal does not affect the evacuation of the remaining compartments 362, 364 and 366.

Similarly, failure of any of the remaining sealing units 380, 381 or 382 will cause its respective valve closure member 452 to close. If sealing unit 380 should also fail to establish an endless seal with the ground surface, for example, then valve closure member 452 of valve assembly 432 will also close, sealing off chamber 400 from chambers 396, 402 and 404 in which reduction of air pressure is taking place as a result of operating compressor 336.

Thus, it will be appreciated that the foregoing multiple compartment embodiment is particularly useful on rough or uneven terrain which may preclude the establishment of an endless seal over a widespread area.

Referring now to FIGURE 23, a lifting crane 470 is shown mounted on vehicle 20 in place of winch 326. Crane 470 comprises a suitable rigid base 472 fixed to body 22 and a boom 474 swingably mounted on base 472 by means of a pivot post 476. The outer end of boom 474 may overhang vehicle 20 in the manner shown and rotatably mounts a pulley 478 over which a lifting cable 480 is guided. Cable 480 is wound around a rotatable drum 482 of a winch assembly 484 for lifting and lowering loads secured to cable 480. A boom cable 486 is secured at one end to boom 474 and is wound around a drum 488 which may be rotated by any suitable means to selectively vary the angular position of boom 474.

With continued reference to FIGURE 23, vehicle 20 is the same as that described in the embodiment of FIGURES 1–14 or it may contain the added valve unit 391 and the partitions 368, 370 and 372 providing for the multiple evacuation compartments 360, 362, 364 and 366 in the embodiment of FIGURES 15–22. From FIGURE 23, it is apparent that in lifting loads with crane 470, a large overhanging force acts on vehicle 20 tending to tilt it about wheels 52 and 54. This tilting force is effectively resisted by evacuation of compartment 47 and by the cooperation of sealing unit 280 in the manner previously described.

Referring now to FIGURE 24, a jet engine silencer unit 490 is shown to be mounted on vehicle 20 in place of winch 326. Jet engine silencer unit 490 essentially comprises a horizontally disposed tubular silencer 492 which is of conventional form and which is mounted on body 22 of vehicle 20 by means of spaced apart support posts 494. In operation of silencer unit 490, vehicle 20 is arranged so that the tubular silencer 492 is positioned in substantial axial alignment with the discharge from a jet engine shown in phantom lines at 496.

With continued reference to FIGURE 24, vehicle 20 is the same as that described in the embodiment of FIGURES 1–14 or it may contain the added valve unit 391 and partitions 368, 370 and 372 providing for the multiple evacuation compartments 360, 362, 364 and 366 in the embodiment of FIGURES 15–22.

FIGURES 25–34 illustrate another embodiment of the present invention wherein the reference numeral 500 generally designates a lightweight aero bomb truck adapted to transport bombs and to lift a bomb load up to the bomb bay of an aircraft.

With reference to FIGURES 25, 26 and 31, bomb truck 500 comprises a rigid body frame 502 non-yieldingly supported by a pair of front wheels 504 and a pair of rear wheels 506. Wheels 504 and 506 are respectively rotatably suspended from rigid spindle carrying arms indicated at 507 and 507a. Arm 507 and 507a are rigidly fixed to frame 502. Front wheels 504 may be dirigibly mounted on frame 502 to enable truck 500 to be more easily moved about.

Extending vertically downwardly from opposite sides of frame 502 are rigid structural channels 508 and 510 having inverted U-shaped cross-sections (FIGURE 26). Channels 508 and 510 are fixed to frame 502 with channel 508 extending between wheels 504 and 506 on the left-hand side of truck 500 and channel 510 extending between wheel 504 and 506 on the right-hand side of truck 500. Frame 502 and channels 508 and 510 are supported clear of the ground by wheels 504 and 506 in the manner shown.

With continued reference to FIGURES 25 and 26, a bomb rack 512 is swingably mounted on frame 502 by means of cradling arm and hydraulic unit assembiles 516 and 517 which are substantially identical in construction with like reference numerals identifying like parts. As viewed from FIGURE 26, assembly 516 is disposed to the left-hand side of rack 512 and assembly 517 is disposed on the right-hand side of rack 512.

Each assembly comprises a bellcrank 518 pivotally mounted on frame 502 by means of a transversely extending pivot post 519. Bellcrank 518 is formed with a bent rigid arm 520 extending toward the rear of truck 500 and a rigid straight arm 521a extending upwardly at generally right angles to arm portion 520. Arm 520 of assembly 516 extends along the left-hand side of rack 512 and is pivotally secured to rack 512 by a transverse horizontal post 521 approximately midway between the front and rear faces of rack 512. The axis of post 521 is in parallel spaced apart relationship to the axis of post 519.

With continued reference to FIGURES 25 and 26, bellcrank 518 is swingable about the axis of post 519 by a hydraulic motor unit 522 having a cylinder 523 pivotally secured to frame 502 by a horizontal post 524 which extends in parallel spaced apart relationship to post 519. A power piston actuator 525 projects upwardly beyond cylinder 523 and is pivotally connected at its outer end to arm 521a by a horizontal post 526 extending in parallel spaced apart relationship with post 519.

As best shown in FIGURE 25, each assembly includes a guide arm 527 which extends upwardly along the side of rack 512 and which is pivotally secured to rack 512 by a pivot post 528. The axis of post 528 is spaced, in parallel relationship, below and somewhat to the rear of the axis of post 521. As shown, guide arm 527 extends forwardly and downwardly from post 528 and has its opposite end pivotally mounted on frame 502 by a post 529. Post 529 is parallel with post 528. Guide arm 527 cooperates with bellcrank 518 to prevent rack 512 from tipping forwardly or rearwardly from the horizontal position shown. The axes posts 519, 521, 524, 526, 528 and 529 in assembly 516 respectively align with the corresponding identified posts in assembly 517.

With the foregoing bellcrank and hydraulic motor construction, actuators 525 of assemblies 516 and 517 are displaced by supplying hydraulic pressure to cylinders 533 in the usual manner. Outward displacement of actuators 525 swing bellcranks 518 of assemblies 516 and 517 in a clockwise direction as viewed from FIGURE 25. As a result, rack 512 is swung upwardly and forwardly to the position shown in phantom lines and indicated at 530 in FIGURE 25.

Thus, rack 512 may be loaded with bombs or other material when it is in its lowermost position shown in full lines in FIGURES 25 and 26. Truck 500 may then be moved to a position beneath an aircraft bomb bay where rack 512 is raised to the position indicated at 530 for removing the load carried by the rack. Convenient stop abutments (not shown) may be provided to limit the travel of rack 512 in both directions.

With continued reference to FIGURES 25 and 26, truck 500 is conveniently provided with a handle 532 of conventional form for moving truck 500. Handle 532 is pivotally mounted on frame 502 near wheels 504 by means of a horizontal post 534.

When rack 512 is loaded with bombs and lifted to a position indicated at 530, it will be appreciated that the center of gravity of truck 500 is raised considerably to make the truck readily susceptive to shifting and tipping particularly when the truck is used aboard a marine vessel such as an aircraft carrier where the deck pitches and is often slick.

To resist tipping and shifting forces acting on truck 500 to thereby improve the stability of truck 500 without adding any appreciable mass to the truck, a pair of elongated pressure pads 538 and 540 are provided as shown in FIGURES 25–28.

Pressure pads 538 and 540 are of the same construction and have lengths substantially equal to the longitudinal distance between front and rear wheels 504 and 506. As viewed from FIGURE 26, pad 538 is disposed on the left-hand side of truck 500 and pad 540 is disposed on the right-hand side of truck 500 in parallel relationship.

With reference to FIGURES 25–28, each of the pressure pads 538 and 540 comprises a rigid hollow housing 542 of generally rectangular shape having parallel spaced apart side walls 544 and 546 (FIGURES 27 and 28) and opposed parallel spaced apart end walls 548 and 550 (FIGURE 27) extending perpendicularly between side walls 544 and 546. The bottom edges of side walls 544 and 546 and end walls 548 and 550 are contained in a common plane.

As best seen from FIGURES 27 and 28, the bottom edges of side walls 544 and 546 and end walls 548 and 550 define an open bottom. The top of housing 542 is closed by a wall 554 (FIGURE 28) having portions 556 and 558 which slope downwardly toward side walls 544 and 546 respectively from a longitudinal apex midway between side walls 544 and 546.

As best shown in FIGURE 27, the hollow interior of housing 542 is divided into a series of evacuation compartments 560 by a series of parallel uniformly spaced apart partitions 562 extending at right angles between side walls 544 and 546. Thus, compartments 560 are disposed in end-to-end relationship between end walls 548 and 550 and are of uniform size and shape, with each compartment 560 having an open bottom of generally square shape as indicated at 568 (FIGURE 28).

With continued reference to FIGURES 27 and 28, a rigid pipe 570 is disposed in housing 242 and extends from end wall 548 to end wall 550 midway between side walls 544 and 546 and at right angles to end walls 548 and 550. Pipe 570 is closed at both ends by end walls 548 and 550 and passes through compartments 560. Formed in pipe 570 are a series of ports 576 corresponding in number to compartments 560 with one in each compartment 560 so that compartments 560 are in fluid communication with the interior of pipe 570 independently of each other.

With continued reference to FIGURES 27, 28 and 29, each of the evacuation compartments 560 is provided with a flexible endless sealing strip 580 made of rubber or other suitable material and having a square contour interfittingly corresponding to the shape of open bottom 568. Sealing strip 580 is formed with an endless bead 582 and a sealing lip 584 having an undulated shape in cross-section. Sealing lip 584 is arranged to project through the open bottom 568 of its compartment 560 for sealing engagement with the vehicle support surface when housing 542 is disposed in the position shown in full lines in the drawings. Sealing strip 580 may be made of a single length with its ends joined together or it may be made up of a plurality of segments joined together to form an endless seal.

As best shown in FIGURES 28 and 29, sealing strip 580 is retained in place within its respective compartment 560 by an endless four-sided insert member 586. Insert member 586 has a generally square contour and comprises a spring clip skirt 588. As best seen in FIGURE 28, skirt 588 has an undulated shape in cross-section conforming generally to the cross-sectional shape of sealing strip 580.

As shown in FIGURE 29, skirt 588 is formed with two straight side sections 589 and 590 extending parallel to side walls 544 and 546 and with straight transverse sections 591 and 592 which perpendicularly join corresponding ends of side sections 589 and 590. Skirt 588 interfittingly extends into the square opening formed by sealing strip 580 and is sprung outwardly to interfit bead 582 and firmly press bead 582 into intimate contact with the surfaces of partitions 562 and the surfaces of housing 542 forming compartment 560. As a result, bead 582 establishes an endless fluid tight seal around the periphery of compartment 560.

With continued reference to FIGURES 28 and 29, insert member 586 is provided with two flat sided mounting wall sections 594 and 596. Wall section 594 extends upwardly and inwardly from the side section 589 of skirt 588. Similarly, wall section 596 extends upwardly and inwardly from the side section 590 of skirt 588.

As best seen in FIGURE 28, wall sections 594 and 596 respectively interfittingly abut the sloping flat interior surfaces of top wall portions 556 and 558 respectively. Joining corresponding ends of wall sections 594 and 596 are a pair of upright wall sections 598 and 600 which respectively extend upwardly from the opposite straight sections 591 and 592 of skirt 588. Sections 598 and 600 are notched at 601 to receive pipe 570 which fits snugly with top wall 554.

Insert member 586 is suitably fixed to closure wall 554 of housing 542 as by screws 602 which extend through mounting wall sections 594 and 596. In the assembly of sealing strip 580 and of member 586, it will be appreciated that member 586 may be inserted into its compartment 560 as a unit and secured in place as previously described. Sealing strip 580 then may be forced into place between spring clip skirt 588 and the interior surfaces of partitions 562 and of housing 542 forming the compartment. As a result, sealing skirt 580 is readily removable for replacement which, under certain conditions, may be required as a consequence of wear.

The division of the interior of housing into multiple compartments 560 as just described makes it possible for sealing strips 580 to be of small size as compared to providing a single endless sealing strip for the open bottom of housing 542. As a result, replacement of sealing strips 580 which have become worn is more readily facilitated. Also, under conditions where wear of the seals for compartments 560 is localized, such as, for example, at one end of the pressure pad or the other, considerable savings are realized by having only to replace the comparatively small sized sealing strips 580 which are worn.

With continued reference to FIGURES 26, 28 and 30, pressure pad 538 is swingably supported on frame 502 by means of a pair of rigid spaced apart generally L-shaped brackets 606 and 608. Bracket 606 is fixed to housing 542 near the end of housing 542 adjacent to front wheels 504 and extends inwardly beneath frame 502. As best shown in FIGURE 28, bracket 606 is formed with an upwardly extending arm portion 610 and is pivotally mounted on frame 502 by means of a horizontal pivot pin 614 which extends through arm portion 610 along an axis extending parallel to pipe 570 and at right angles to the rotational axis of wheels 506. Pivot pin 614 is fixedly carried by an ear 616 rigidly fixed to frame 502 and extending downwardly from channel member 508. Bracket 606 is rotatably retained against axial displacement on pivot pin 614 by engagement with ear 616 on one side and by a split ring 617 (FIGURE 32) on its opposite side. Ring 617 is securely seated in an annular groove formed in the periphery of pin 614.

Bracket 608 is of the same construction as bracket 606 and is fixed to housing 542 near the end of pad 538 adjacent to rear wheel 506. As shown in FIGURE 30, bracket 608 extends inwardly beneath frame 502 in parallel relation to bracket 606 and has an upwardly extending pivot arm portion 618 which is pivotally mounted to a rigid ear 620 by a pivot pin 622. Pin 622 is fixedly carried by ear 620 which, in turn, is fixed to frame 502 and which extends vertically downwardly from channel member 508. Bracket 608 is axially retained in place on pivot pin 622 by engagement with ear 620 on one side and by engagement with a split ring 623 (FIGURE 33) on its opposite side. Ring 623 is securely seated in an annular groove formed in the periphery of pivot pin 622.

As best shown in FIGURE 25, ear 616 is disposed forwardly of bracket 606 and ear 620 is disposed rearwardly of bracket 608. Thus, both brackets 606 and 608 extend upwardly between ears 616 and 620 and abut ears 616 and 620 respectively. As a result, ears 616 and 620 prevent significant longitudinal movement of pressure pad 538 relative to truck 500. Lateral movement of pad 538 relative to truck 500 is prevented by pivot pins 614 and 622 in cooperation with ears 616 and 620 of brackets 606 and 608.

As best shown in FIGURE 25, pivot pins 614 and 622 extend along a common axis disposed laterally outwardly of wheels 504 and 506 on the left-hand side of truck 500 and at right angles to the rotational axis of wheels 506. This common axis of pivot pins 614 and 622 is arranged parallel with a flat vehicle support surface 624 (FIGURE 25) and at a predetermined distance above the support surface.

With this pivotal mounting structure, pad 538 is swingable about the common axis of pivot pins 614 and 622 between a ground-engaging horizontal position shown in full lines in the figures and a raised vertical position shown in phantom lines as indicated at 626 in FIGURE 26.

In its ground-engaging position, pad 538 is disposed laterally outwardly of wheels 504 and 506 on the left-hand side fo truck 500 with housing side wall 546 at a spaced lateral distance from wheels 504 and 506 as best shown in FIGURE 26. The longitudinal axis of pad 538 which may be considered to be common with the axis of pipe 570 extends at right angles to the rotational axis of rear wheels 506 and in parallel relationship with support surface 624 which, in this embodiment, is shown to be flat. This relationship of pad 538 to truck 500 and to support surface 624 makes it possible for each of the endless sealing lips 584 of evacuating compartments 560 to properly sealingly engage support surface 624 around the periphery of the open bottoms 568 of compartments 560. Thus, when pressure pad 538 is in its ground-engaging position, support surface 624 cooperates with sealing strips 580, with housing 542 and with partitions 562 to provide a confined space in each compartment 560.

As best seen in FIGURES 28 and 30, brackets 606 and 608 respectively are provided with stop abutment sections 628 and 630. Sections 628 and 630 respectively are formed integral with pivot arm portions 610 and 618 vertically above pivot pins 614 and 622. Abutment sections 628 and 630 respectively are formed with laterally outwardly facing flat surfaces 632 and 634. When pressure pad 538 is in its ground-engaging position, surfaces 632 and 634 are abuttingly non-interlockingly engageable with an inwardly facing abutment stop surface 636 formed on channel member 508. Abutment of bracket surfaces 632 and 634 with frame surface 636 limits the travel of pad 538 in a counterclockwise direction as viewed from FIGURE 26. With pressure pad 538 in its ground-engaging position, the weight of pad 538 firmly retains abutment surfaces 632 and 634 in abutting engagement with abutment stop surface 636.

As shown, abutment surface 636 is arranged vertically with respect to vehicle support surface 624 to make it possible for pad 538 to be retained by its own weight in a ground-engaging position which is parallel to support surface 624 with housing 542 supported clear of the vehicle support surface by frame 502. By supporting pressure pad 538 in this manner, proper positioning of sealing strips 580 is assured for establishing unbroken endless seals around the peripheries of the open compartment bottoms 568. Also, in relieving sealing strips 580 of supporting the entire weight of pad 538 on a level surface excessive deformation of sealing strips 580 causing objectionable wear does not occur.

Referring no wto FIGURES 26, 31, 34 and 35, pressure pad 540, being of the same construction as pad 538, is swingably supported on frame 502 by a pair of brackets 638 and 640 which are fixed to housing 542 of pad 540 and which are of the same construction and arranged in the same manner as brackets 606 and 608. Bracket 638 is pivotally suspended from a rigid ear 642 by a pivot pin 644. Pin 644 is fixedly carried by ear 642 which extends downwardly from channel 510 and which is fixed to channel 510 by any suitable means (not shown). Bracket 638 is axially retained on pivot pin 644 by engagement with ear 642 on one side and by engagement with a split ring 645 (FIGURE 34) on the opposite side. Ring 645 is securely seating in an annular groove formed in the periphery of pivot pin 644.

As best shown in FIGURE 35, bracket 640 is pivotally mounted on a rigid ear 645 by a pivot pin 646. Ear 645 fixedly carries pivot pin 646 and is suitably fixed to channel member 510. Bracket 640 is retained against axial displacement on pivot pin 646 by engagement with ear 645 on one side and by engagement with a split ring 647 on the opposite side. Ring 647 is securely seated in an annular groove formed in the periphery of pin 646.

As best shown in FIGURE 31, brackets 638 and 640 extend between ears 642 and 645 and respectively abuttingly engage ear 642 and ear 645. Thus, ears 642 and 645 retain pressure pad 540 against longitudinal motion relative to truck 500. Pivot pins 644 and 646 cooperate with brackets 638 and 640 and with ears 642 and 645 to retain pad 540 against lateral movement relative to truck 500.

Pivot pins 644 and 646 have a common axis contained in a plane passing through the common axis of pivot pins 614 and 622 and extending parallel with the vehicle support surface 624.

Thus, pressure pad 540 is swingable about the common axis of pivot pins 644 and 648 between a raised vertical position and a horizontal ground-engaging position in the same manner as pad 538. Clockwise travel of pad 540, as viewed from FIGURE 26, is limited by abutment of brackets 638 and 640 with an inwardly facing vertical surface on channel member 510 in the same manner as described with respect to pressure pad 538.

As best shown in FIGURES 25, 26 and 31 pressure pads 538 and 540 are symmetrically arranged about the longitudinal axis of truck 500 with pad 540 extending laterally outwardly from wheels 504 and 506 on the right-hand side of truck 500 (as viewed from FIGURE 26) by a distance equal to the laterally outward displacement of pressure pad 538. The identical construction of pads 538 and 540 and the identical pivot pin and stop abutment mounting structure for pads 538 and 540 make it possible for pads 538 and 540 to be positioned on the same level when positioned in their respective ground-engaging position to thereby assure a sealed confinement of the compartments 560 in pads 538 and 540 and to further assure a balance of force acting on truck 500 as a result of evacuating compartments 560 of both pads.

As viewed from FIGURE 26, pressure pad 538 is swingable upwardly in a clockwise direction when not in use and is fixed with its housing top wall 554 facing toward frame 502. Pad 538 is retained in this position by means of a hook 652 swingably mounted in frame 502 and engageable with an eyelet 654 fixed to housing 542 of pad 538.

Similarly, pad 540 is swingable about the common axis of pivot pins 644 and 648 in a counterclockwise direction, as viewed from FIGURE 26, to a generally vertical position adjacent channel member 510. Pad 540 is retained in its vertical position by means of a hook 656 swingably mounted on frame 502 and engageable with an eyelet 658 fixed to housing 542 of pressure pad 540.

To evacuate compartments 560 of each of the pressure pads 538 and 540, an evacuation power plant unit 660 is mounted in a casing 662 extending between front wheels 504 and fixed to frame 502. Power plant unit 660 comprises an engine 664 which may be the same as that described in the embodiments of FIGUREE 1–14 or of any other suitable type. Engine 664 is drivingly connected to an evacuation compressor 666. Compressor 666 is provided with an inlet 668 connected to the compartment exhaust pipes 570 of pads 538 and 540 by means of flexible conduits 670 and 672 respectively. Conduits 670 and 672 each have rigid adaptor ends indicated at 674 (FIGURE 30) and extending through the housings 542 of pressure pads 538 and 540 for connection to exhaust pipes 570 approximately midway between the ends thereof.

While truck 500 is being moved, pressure pads 538 and 540 normally are swung upwardly in their raised positions as indicated at 626 in FIGURE 26. When truck 500 is disposed in a stable position and it is desired to increase the stability of the truck, pressure pads 538 and 540 are swingably dropped to their ground-engaging positions as shown in full lines in the figures to sealingly confine compartments 560. Engine 664 is operated to drive compressor 668 to evacuate the air confined in compartments 560 and to discharge the air through louvered opening 676 in casing 662.

With reference now to FIGURE 36, a differential valve 686 is shown for controlling the evacuation of air from each of the compartments 560. Valve 686 is essentially of the same construction as valve 430 illustrated in FIGURE 19 with like reference numerals identifying like parts except that valve 686 is provided with a valve seating member 688 of modified shape for fitting into its respectively pipe port 576.

The operation of valves 686 is the same as that described with respect to valves 430. When air pressure within the interior of pipe 570 is approximately equal or greater than the air pressure in compartments 560, the valve closure members 452 of valves 686 are biased open by springs 460 and extend into their respective compartments 560. Valves 686 are held in this valve opened position by springs 460, thus allowing for passage of air from evacuation compartments 560 to the interior of pipe 570 which is in continuous fluid communication with the inlet of compressor 666.

If one of the compartments 560 should be ineffectively sealed to allow leakage of air into the compartment, a pressure differential is established, as previously explained, to produce an unbalanced force which overcomes the bias of spring 460 to seat valve closure member 452 and thereby interrupt air flow from the leaking compartment. The closure members of the remaining valves 686 will be acted upon by a diminishing pressure to allow their springs 460 to maintain them in valve open position, thus permitting full evacuation of air from the remaining compartments 560 which are effectively sealed with respect to the vehicle support surface.

By evacuating the air confined in compartments 560, downwardly acting forces are produced on pads 538 and 540 by atmospheric pressure acting over the entire top surfaces of walls 554 of pads 538 and 540. Since pads 538 and 540 are retained against lateral or longitudinal displacement relative to truck 500 as previously described, the pressure-weighted forces applied to pads 538 and 540 improve the stability of the truck by effectively increasing the weight of the vehicle and the adherent force thus resisting upsetting forces tending to shift the truck forwardly, rearwardly or laterally. The pressure-weight forces exerted on pressure pads 538 and 540 are transmitted through brackets 606, 608, 638 and 640, and through pivot pins 614, 622, 644 and 646 to body frame 502 to press wheels 504 and 506 more firmly against surface 624 and thereby increase the adherent frictional force of truck 500.

Pressure pads 538 and 540 are especially effective in resisting tipping and lifting forces tending to upset truck 500 and particularly tending to fulcrum the truck about its left-hand wheels or its right-hand wheels. For example, when a force is applied to tip truck 500 about its right-hand wheels, the tendency of truck 500 to tip over is resisted by the pressure-weight force produced by pressure pad 538.

Since brackets 606 and 608 are retained firmly in abutment with channel member 508 of frame 502 by the weight of pressure pad 538, the downwardly acting pressure-weight force on pressure pad 538 is able to act along a moment arm extending laterally from wheels 504 and 506 on the right-hand side of truck 500 to a position well beyond the wheels on the left-hand side of truck 500, as viewed from FIGURE 26. Thus, as a result of positioning pressure pad 538 laterally outwardly of wheels 504 and 506 on the right-hand side of truck 500, this force-acting moment arm is of an appreciable length to produce a correspondingly large moment in opposition to any upsetting moments acting to tip truck 500. The resistive pressure-weighted force produced by pressure pads 538 and 540 thus appreciably supplements the normal weight of the truck which acts along a center of gravity extending approximately midway between the right-hand and left-hand wheels of truck 500. Since the moment arm along which the pressure-weight force produced by the pads is close to three times as great as the moment arm along which the weight of truck 500 acts, the magnification of the pressure-weight force will yield a moment of considerable magnitude. Thus, it will be appreciated that the pressure pads coact with frame 502 in a manner comparative to an outrigger to assure stability of the vehicle even under extremely adverse conditions, such as a rolling and pitching ship deck with rack 512 in its elevated position indicated at 530 in FIGURE 25. Since the wheels are non-yieldingly connected to the frame 502, the full atmospheric-pressure-weighted forces in this embodiment of the invention are also fully effective to increase the adherent force of the vehicle relative to the support surface.

The invention may be embodiend in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle having a set of wheels arranged to engage a vehicle support surface and including at least one dirigible wheel having a wheel spindle, a chassisless vehicle body supported by said set of wheels clear of said support surface, and means for swivelly retractably mounting said dirigible wheel on said body, said means comprising: a member fixed to said body, a first rigid arm rotatably mounted on said member about an upstanding axis, a second rigid arm carrying said spindle, means pivotally connecting said second rigid arm to said first rigid arm for swinging movement about an axis extending in parallel spaced apart relationship to the axis of said spindle, and a hydraulic motor connected to said first rigid arm and to said second rigid arm and being operable by application of pressurized hydraulic fluid to selectively swing said second rigid arm in opposite directions about its pivot axis to thereby retract and extend said dirigible wheel, and means for selectively rotating said first and second rigid arms as a unit about said upstanding axis to turn said dirigible wheel in one direction or the other.

2. A vehicle comprising a set of vehicle support wheels adapted to engage a vehicle support surface, a body formed with an open bottom through which at least one of said wheels is arranged to partially project for supporting said body clear of said support surface, means for selectively raising and lowering said body relative to said support surface, said body cooperating with said support surface in lowered position to form a chamber, means for enabling sub-atmospheric evacuation of the air from said chamber to produce an atmospheric-pressure-weighted force on said body, and sealing means attached to said body around the periphery of said bottom opening, said sealing means being carried by said body when said body is supported clear of said surface and being arranged to engage with said surface by lowering said body to form with said surface an endless seal between said body and said surface in surrounding relationship to said open bottom, said sealing means comprising an endless rigid loading rim flexibly carried by said body and extending partially beyond the bottom edges of said body defining said bottom opening, said loading rim being arranged to engage said surface by lowering said body, said body being arranged relative to said loading rim in its lowered position such that it rests on said loading rim with said bottom edges in abutment with said loading rim, and an endless flexible rim surrounding and attached to said loading rim, said endless flexible rim extending outwardly beyond said loading rim for sealing engagement with said surface when said loading rim is rested on said surface.

3. The vehicle as defined in claim 2 wherein said sealing means comprises a flexible endless diaphragm surrounding said open bottom and being secured to said body and said loading rim respectively to establish an endless fluid tight seal between said loading rim and said body in surrounding relationship to said open bottom and to carry said loading rim clear of said support surface when said body is raised clear of said support surface.

References Cited by the Examiner

UNITED STATES PATENTS

| | | |
|---|---|---|
| 936,395 | 10/1909 | Worthington. |
| 1,695,928 | 12/1928 | Perin _____ 280—79.2 |
| 1,698,482 | 1/1929 | Nicin _____ 180—7 |
| 2,046,105 | 6/1936 | Bowen _____ 280—79.2 |
| 2,405,893 | 8/1946 | Leftwich _____ 214—15 |
| 2,540,100 | 2/1951 | Coeur _____ 280—43.23 |
| 2,564,996 | 8/1951 | Rasbach _____ 280—78 X |
| 2,719,471 | 10/1955 | Aspden et al. _____ 280—79.2 X |
| 2,743,787 | 5/1956 | Seck. |
| 3,029,042 | 4/1962 | Martin _____ 180—7 |
| 3,039,550 | 6/1962 | Beardsley _____ 180—7 |
| 3,116,897 | 1/1964 | Theed _____ 188—5 X |
| 3,165,217 | 1/1965 | Harris et al. _____ 180—7 X |

FOREIGN PATENTS

| | | |
|---|---|---|
| 1,272,678 | 8/1961 | France. |
| 1,273,294 | 8/1961 | France. |
| 869,352 | 5/1961 | Great Britain. |

A. HARRY LEVY, *Primary Examiner.*